United States Patent
Sasaki et al.

(10) Patent No.: US 6,173,329 B1
(45) Date of Patent: Jan. 9, 2001

(54) DISTRIBUTED MULTIMEDIA SERVER DEVICE AND DISTRIBUTED MULTIMEDIA SERVER DATA ACCESS METHOD

(75) Inventors: Chikara Sasaki; Katsuhiko Fukazawa; Hideharu Suzuki; Kazutoshi Nishimura, all of Tokyo (JP)

(73) Assignee: Nippon Telegraph and Telephone Corporation, Tokyo (JP)

( * ) Notice: Under 35 U.S.C. 154(b), the term of this patent shall be extended for 0 days.

(21) Appl. No.: 09/026,282

(22) Filed: Feb. 19, 1998

(30) Foreign Application Priority Data

Feb. 19, 1997 (JP) ............................................. P09-034765
Sep. 3, 1997 (JP) ............................................. P09-238038

(51) Int. Cl.[7] .................................................. G06F 13/00
(52) U.S. Cl. ........................ 709/231; 709/203; 709/213; 709/217; 709/219; 709/201
(58) Field of Search .................................... 709/201, 203, 709/213, 217, 219, 231

(56) References Cited

U.S. PATENT DOCUMENTS

| | | | | |
|---|---|---|---|---|
| 5,550,982 | * | 8/1996 | Long et al. ........................... | 709/219 |
| 5,581,784 | * | 12/1996 | Tobagi et al. .......................... | 710/6 |
| 5,606,359 | * | 2/1997 | Youden et al. ......................... | 348/7 |
| 5,668,948 | * | 9/1997 | Belknap et al. ........................ | 709/231 |
| 5,712,976 | * | 1/1998 | Falcon, Jr. et al. ................... | 709/219 |
| 5,732,239 | * | 3/1998 | Tobagi et al. .......................... | 710/6 |
| 5,787,459 | * | 7/1998 | Stallmo et al. ........................ | 711/112 |
| 5,802,394 | * | 9/1998 | Baird et al. ............................ | 710/5 |
| 5,805,821 | * | 9/1998 | Saxena et al. ......................... | 709/213 |
| 5,930,473 | * | 7/1999 | Teng et al. ............................. | 709/204 |

FOREIGN PATENT DOCUMENTS

| | | |
|---|---|---|
| 0735758 | 10/1996 | (EP) . |
| 7107425 | 4/1995 | (JP) . |
| 8190533 | 7/1996 | (JP) . |

\* cited by examiner

*Primary Examiner*—Glenton B. Burgess
*Assistant Examiner*—Abdullahi E. Salad
(74) *Attorney, Agent, or Firm*—Greer, Burns & Crain, Ltd.

(57) ABSTRACT

A distributed multimedia server device for delivering requested multimedia data to terminals is formed by more than one storage server modules for distributedly storing fixed length multimedia blocks dividing each multimedia data, and reading out multimedia blocks in response to multimedia block read requests, more than one communication server modules, each capable of receiving a multimedia data read request for one multimedia data from a terminal through a connection set up with respect to the terminal, issuing the multimedia block read requests to the storage server modules so that the storage server modules read out multimedia blocks corresponding to that one multimedia data, and periodically delivering the multimedia blocks read out and transferred by the storage server modules to the terminal through the connection using a delivery period corresponding to a playback time of one multimedia block, and an inter-server module network for supporting communications between any of the storage server modules and any of the communication server modules.

11 Claims, 16 Drawing Sheets

DISTRIBUTED MULTIMEDIA SERVER DEVICE AND DISTRIBUTED MULTIMEDIA SERVER DATA ACCESS METHOD

BACKGROUND OF THE INVENTION

1. Field of the Invention

The present invention relates to a distributed multimedia server device for delivering multimedia data to a plurality of terminals in response to a request from each terminal, and a distributed multimedia server data access method to be used in delivering multimedia data from a distributed multimedia server device to a plurality of terminals or storing multimedia data into a distributed multimedia server device from a multimedia data input device.

2. Description of the Background Art

Conventionally, a service for delivering multimedia data to each terminal has been realized by a single multimedia server device.

FIG. 1 shows a schematic configuration of a conventional single multimedia server device, in which a communication control unit 111 carries out communications with terminals and a central control unit 112 controls the multimedia server device as a whole, while a memory unit 113 temporarily stores multimedia data, etc. at a time of delivery to a terminal and a storage unit 115 stores multimedia data, where data transfers among the communication control unit 111, the central control unit 112, the memory unit 113 and the storage unit 115 are provided by a system bus 114.

In a case of a single multimedia server device as shown in FIG. 1, there is a limitation on a maximum number of simultaneously connectable terminals due to a transfer neck of the system bus 114 and an input/output rate neck of the storage unit 115. For this reason, there has been a proposition to increase the maximum number of simultaneously connectable terminals by using a distributed multimedia server device in which a plurality of server modules are connected through a network.

FIG. 2 shows a system configuration using a conventional distributed multimedia server device, in which each one of terminals 211 to 21L issues a multimedia data read request to a distributed multimedia server device 23 through a terminal side network 22 and playbacks received multimedia data. Here, the terminal side network 22 is a network connecting the terminals 211 to 21L with the distributed multimedia server device 23.

The distributed multimedia server device 23 comprises server modules 2311 to 231M for carrying out delivery of multimedia data with respect to terminals, and a control module 232 for receiving requests from terminals and issuing multimedia data delivery requests to the server modules.

One multimedia data is divided into fixed length multimedia blocks and distributedly stored in a plurality of server modules 2311 to 231M. Note that each one of the server modules 2311 to 231M has a configuration similar to that shown in FIG. 1 so that each server module can operate as a single multimedia server device. The delivery of multimedia data using this distributed multimedia server device is carried out as follows.

(1) A multimedia data read request containing an identifier of a program to be read is transmitted from a terminal 21$i$ to the control module 232 via the terminal side network 22.

(2) A multimedia data delivery request is transmitted from the control module 232 to all the server modules 2311 to 231M via the terminal side network 22.

(3) Each of the server modules 2311 to 231M delivers multimedia block that is distributedly stored in each server modules to the terminal 21$i$ via the terminal side network 22, while maintaining synchronization with respect to the other server modules so that the terminal does not receive multimedia data from a plurality of server modules simultaneously.

(4) The multimedia data delivery for a plurality of terminals is carried out simultaneously in a similar manner. In other words, there can be cases where a destination terminal of multimedia block deliver by one server module is different for successive multimedia blocks to be delivered.

However, the conventional distributed multimedia server device has been associated with the following problems.

(1) There is a need for each server module to maintain synchronization with respect to the other server modules so that the terminal does not receive multimedia data from a plurality of server modules simultaneously.

(2) The server module sequentially delivers multimedia data to different terminals, but when the terminal side network 22 is connection-less, there can be cases where multimedia data are not delivered to the terminal as intended because of collisions in the network so that the playback at the terminal can be interrupted. On the other hand, when the terminal side network 22 is connection oriented, there is a need for one server module to either maintain connections with all the terminals or repeat connection set up and release with respect to the terminals in short time intervals dictated by multimedia block delivery time.

In the former case it is necessary to maintain connections even while multimedia data delivery does not take place, whereas in the latter case a processing for connection set up and release causes overhead and an effective connection time during which multimedia data delivery can be carried out becomes relatively short, so that the utilization efficiency of the terminal side network 22 is low in either case.

(3) There is a need to provide the control module 232 for centralized control of the distributed multimedia server device 23 as a whole, besides the server modules 2311 to 231M for carrying out multimedia data delivery.

(4) When the terminal side network 22 or the communication protocol between the terminals 211 to 21L and the distributed multimedia server device 23 is changed, this change will affect all the server modules 2311 to 231M.

Now, according to the conventional distributed multimedia server data access method, multimedia data for one program is divided into fixed length segments and stored cyclically among the server modules 2311 to 231M. Then, a segment access at one server module is carried out in synchronization with segment accesses at the other server modules.

More specifically, the data read processing by the conventional distributed multimedia server data access method is carried out according to a sequence chart of FIG. 3 as follows.

(1) The control module 232 receives a read request for a certain program from the terminal 21$i$.

(2) The control module 232 issues a delivery request containing a synchronization information to the server module 2311 that stores a top segment of the requested program.

(3) The control module 232 then issues a delivery request containing a synchronization information to all the other server modules so that the other server modules sequentially carry out the data read processing in synchronization according to the synchronization information in such a manner that no interruption occurs in the playback at the terminal 21$i$.

(4) Each server module reads relevant segments according to the synchronization information notified from the control module 232, and transfers the read out segments to the terminal 21$i$.

Next, as a concrete example of the conventional distributed multimedia server data access method, the time-slot centralized management scheme in which each server module manages a plurality of time-slots will be described.

Here, for the sake of simplicity, it is assumed that the distributed multimedia server device has two server modules where a server module #1 has three storage devices 2151, 2152 and 2153 and a server module #2 has three storage devices 2251, 2252 and 2253.

FIG. 4 shows a timing chart for the time-slot processing used in the conventional multimedia server data access method for this exemplary case. In FIG. 4, six time-slot sequences each comprising twenty-four time-slots TS01, TS02, . . . , TS24 of the equal interval are periodically generated in six storage devices. Each one of cycle011, cycle012, . . . , cycle016 indicates a period for reading four time-slots constituting the time-slot sequence (a sub-cycle), and cycle01 indicates a period for reading twenty-four time-slots constituting the time-slot sequence (a cycle), where one cycle comprises six sub-cycles and the time-slot sequences have phases which are sequentially displaced by one sub-cycle.

In this case, segments are sequentially stored in the storage devices 2151, 2152 and 2153 of the server module #1 and then the storage devices 2251, 2252 and 2253 of the server module #2, in this order.

When there is a read request for a certain program from a terminal and the top segment of that program is stored in the storage device 2151 of the server module #1, the server module #1 searches for an idle time-slot which is currently not used by the other read processing or write processing, sequentially in an order of TS01, TS02, . . . , so as to find a time-slot to be used in reading segments of the requested program. Here, whether each time-slot is busy or idle is managed by an information called time-slot management information.

When TS01 is an idle time-slot, for example, the server module #1 notifies the fact that TS01 is an idle time-slot to the server module #2. When this notice is received, the server module #2 updates the time-slot management information to indicate that time-slot TS01 is now busy.

Then, at the server module #1, a segment stored in the storage device 2151 is read out at a timing of the time-slot TS01 in the sub-cycle cycle011, a segment stored in the storage device 2152 is read out at a timing of the same time-slot TS01 in the next sub-cycle cycle012, and a segment stored in the storage device 2153 is read out at a timing of the same time-slot TS01 in the next sub-cycle cycle013. Then, at the server module #2, a segment stored in the storage device 2251 is read out at a timing of the same time-slot TS01 in the next sub-cycle cycle014, a segment stored in the storage device 2252 is read out at a timing of the same time-slot TS01 in the next sub-cycle cycle015, and a segment stored in the storage device 2253 is read out at a timing of the same time-slot TS01 in the next sub-cycle cycle016. Thereafter, the operation returns to the first sub-cycle cycle011 and the similar read processing is repeated as indicated by a dashed line in FIG. 4.

On the other hand, according to the conventional distributed multimedia server data access method, the data write processing is carried out according to a sequence chart of FIG. 5 as follows.

(1) The control module 232 receives a write request for a certain program from an input device (not shown in FIG. 2) via the terminal side network 22.

(2) The control module 232 determines the server module 2311 for writing a top segment of the requested program, and issues a write request containing a synchronization information to this server module 2311.

(3) The control module 232 then issues a write request containing a synchronization information to all the other server modules so that the other server modules sequentially carry out the data write processing in synchronization according to the synchronization information.

(4) Each server module writes relevant segments according to the synchronization information notified from the control module 232.

For this write processing, a concrete example of the conventional distributed multimedia server data access method is also the time-slot centralized management scheme by which the processing for writing segments according to time-slots can be realized similarly as in the case of reading segments according to time-slots described above.

However, the conventional distributed multimedia server data access method has been associated with the following problems.

(1) There is a need to notify the synchronization information with respect to all the server modules.

Moreover, when the terminal issues a read request for another program or a visual search request such as that for jumping to another playback position within the same program, before the reading is completed up to the end of a certain program, there is a need to notify a new synchronization information along with a request for interrupting an access according to the previously notified synchronization information with respect to all the server modules, and this can be problematic when a visual search request is issued frequently or a number of server modules constituting the distributed multimedia server device is large.

In addition, each server module delivers segments of a new program only after the delivery of segments of the previous program to a terminal that was already requested by the control module, so that it appears to take a long response time for a visual search from a viewpoint of a terminal.

In the concrete case of the time-slot centralized management scheme, there is a need to notify a selected time-slot to all the server modules, and when there is a visual search request, there is a need to notify a time-slot release and a newly selected time-slot with respect to all the server modules.

(2) In a case of additionally providing a new server module or a new storage device in the server module, there is a need to change the synchronization information managed by all the server modules. The influence due to this is large when a number of server modules constituting the distributed multimedia server device is large.

In the concrete case of the time-slot centralized management scheme, there is a need to change the time-slot management information managed by all the server modules.

(3) When a communication error occurs for the synchronization information notice, the synchronization information managed by different server modules can be inconsistent so that there is a need to regularly carry out a consistency check for the synchronization information among the server modules. In particular, a possibility for a communication error to occur increases when a number of server modules constituting the distributed multimedia server device is large, so that an amount of consistency check for the synchronization information also increases in such a case.

In the concrete case of the time-slot centralized management scheme, the inconsistency in the time-slot management information managed by the server modules arises when a communication error occurs for a selected time-slot notice or time-slot release notice so that there is a need to regularly carry out the consistency check for the time-slot management information among the server modules.

(4) In order to accurately synchronize the processing according to the synchronization information at each server module over the entire server device, there is a need to establish a time synchronization among all the server modules, and an amount of time synchronization processing increases when a number of server modules constituting the distributed multimedia server device is large.

In the concrete case of the time-slot centralized management scheme, the time-slot phase difference between consecutively ordered storage devices on different server modules must be one sub-cycle, as in the storage device 2153 and the storage device 2251 of FIG. 4 for example, just like the consecutively ordered storage devices on the same server module such as the storage devices 2151 and 2152 of FIG. 4 for example, so that there is a need for the time synchronization among all the server modules.

(5) When a number of server modules increases in the time-slot centralized management scheme, a time-slot cycle becomes long and a response time with respect to a new read request becomes long. For example, in FIG. 4, when there is a new read request, one of twenty-four time-slots within six sub-cycles is to be selected so that the maximum response time is six sub-cycles, but when a number of server modules is doubled, one of forty-eight time-slots within twelve sub-cycles is going to be selected, so that the maximum response time becomes twelve sub-cycles.

SUMMARY OF THE INVENTION

It is therefore an object of the present invention to provide a distributed multimedia server device in which synchronization among server modules is unnecessary and the utilization efficiency of the terminal side network is high.

It is another object of the present invention to provide a distributed multimedia server data access method which can flexibly deal with a case of an increase in a number of terminals to be connected simultaneously or a case of additionally providing a server module or a storage device in the distributed multimedia server device, without causing significant performance degradation.

According to one aspect of the present invention there is provided a distributed multimedia server device for delivering requested multimedia data to a plurality of terminals, comprising: a plurality of storage server modules for distributedly storing fixed length multimedia blocks dividing each multimedia data, and reading out multimedia blocks in response to multimedia block read requests; a plurality of communication server modules, each capable of receiving a multimedia data read request for one multimedia data from a terminal through a connection set up with respect to the terminal, issuing the multimedia block read requests to the storage server modules so that the storage server modules read out multimedia blocks corresponding to said one multimedia data, and periodically delivering the multimedia blocks read out and transferred by the storage server modules to the terminal through the connection using a delivery period corresponding to a playback time of one multimedia block; and an inter-server module network for supporting communications between any of the storage server modules and any of the communication server modules.

According to another aspect of the present invention there is provided a distributed multimedia server data access method for a distributed multimedia server device formed by a plurality of storage server modules for distributedly storing multimedia data, one or more communication server modules for delivering requested multimedia data read out from the storage server modules to terminals, and an inter-server module network for supporting communications between any of the storage server modules and any of the communication server modules, the method comprising the steps of: dividing each multimedia data into fixed length segments, and storing segments over the storage server modules in a cyclic order; sequentially issuing segment read requests from one communication server module to the storage server modules in the cyclic order, in response to a request for one multimedia data of one program from a terminal, at such timings that no interruption is expected to occur in a program playback at the terminal upon delivering segments read out by the storage server modules; and reading out segments for said one multimedia data at the storage server modules in response to the segment read requests from said one communication server module without establishing synchronization among the storage server modules, and delivering segments read out by the storage server modules from said one communication server module to the terminal.

According to another aspect of the present invention there is provided an article of manufacture, comprising: a computer usable medium having computer readable program code means embodied therein for causing a computer to function as a distributed multimedia server device formed by a plurality of storage server modules for distributedly storing multimedia data, one or more communication server modules for delivering requested multimedia data read out from the storage server modules to terminals, and an inter-server module network for supporting communications between any of the storage server modules and any of the communication server modules, the computer readable program code means includes: first computer readable program code means for causing said computer to divide each multimedia data into fixed length segments, and storing segments over the storage server modules in a cyclic order; second computer readable program code means for causing said computer to sequentially issue segment read requests from one communication server module to the storage server modules in the cyclic order, in response to a request for one multimedia data of one program from a terminal, at such timings that no interruption is expected to occur in a program playback at the terminal upon delivering segments read out by the storage server modules; and third computer readable program code means for causing said computer to read out segments for said one multimedia data at the storage server modules in response to the segment read requests from said one communication server module without establishing synchronization among the storage server modules, and delivering segments read out by the storage server modules from said one communication server module to the terminal.

Other features and advantages of the present invention will become apparent from the following description taken in conjunction with the accompanying drawings.

DETAILED DESCRIPTION OF THE PREFERRED EMBODIMENTS

Figure 6:
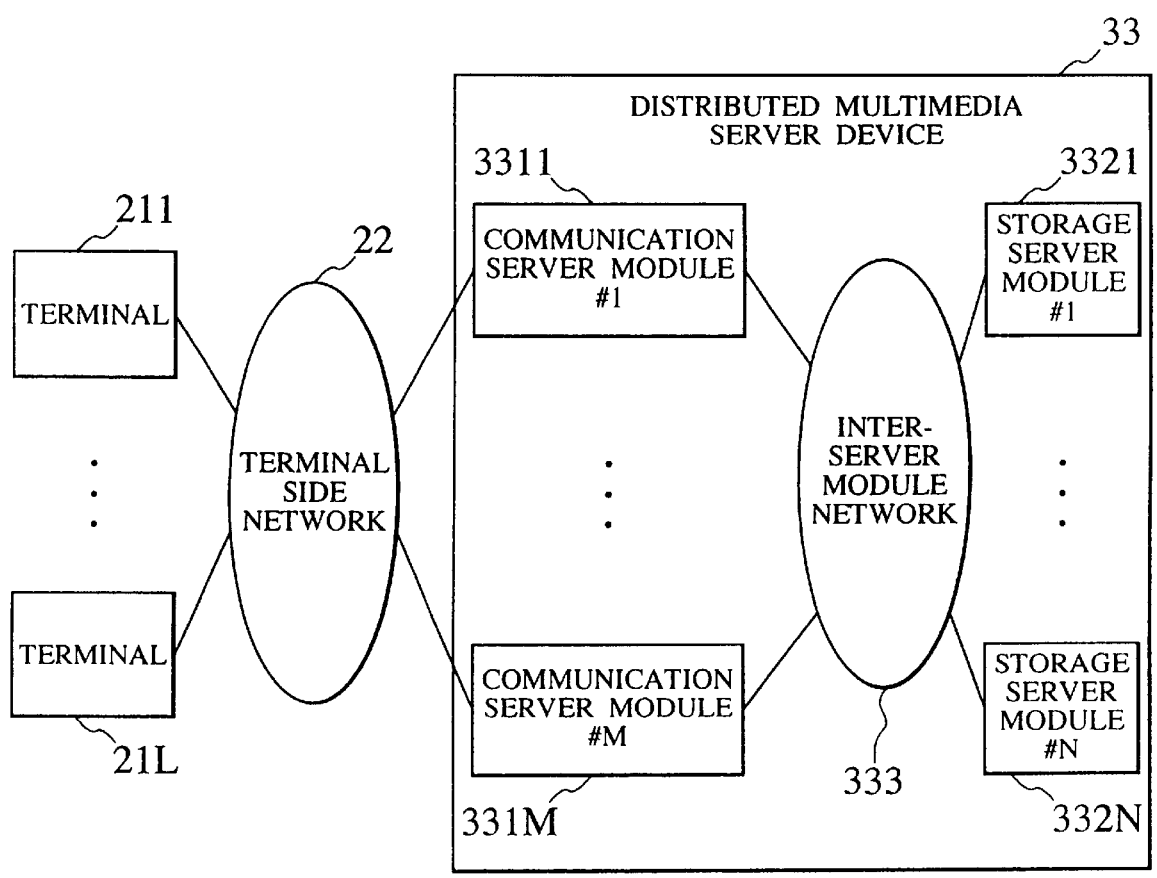
FIG. 6 is a block diagram of a system using a distributed multimedia server device according to the first embodiment of the present invention.
Figure 7:
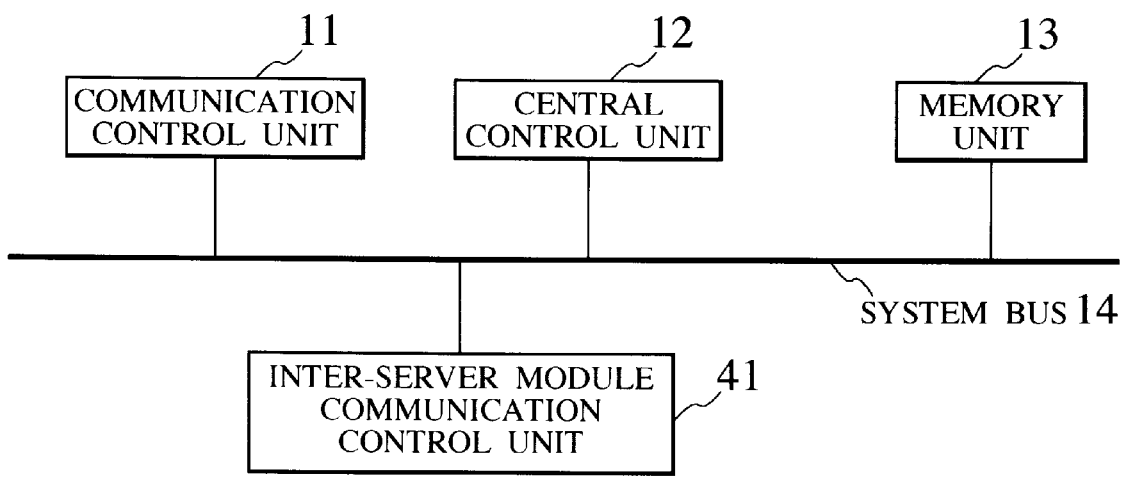
FIG. 7 is a schematic block diagram of each communication server module in the distributed multimedia server device of FIG. 6.
Figure 8:
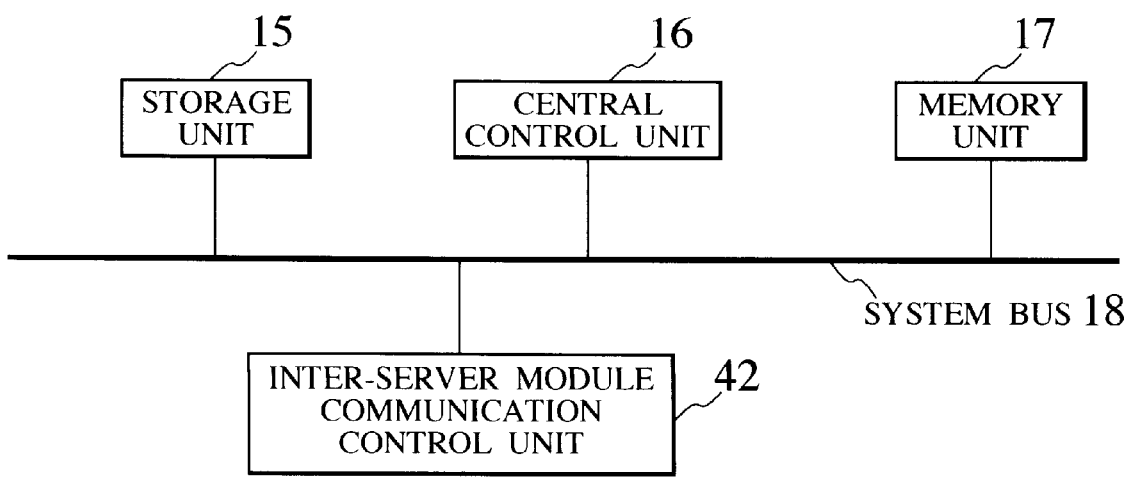
FIG. 8 is a schematic block diagram of each storage server module in the distributed multimedia server device of FIG. 6.

Referring now to FIG. 6 to FIG. 8, the first embodiment concerning a distributed multimedia server device according to the present invention will be described in detail.

Figure 2:
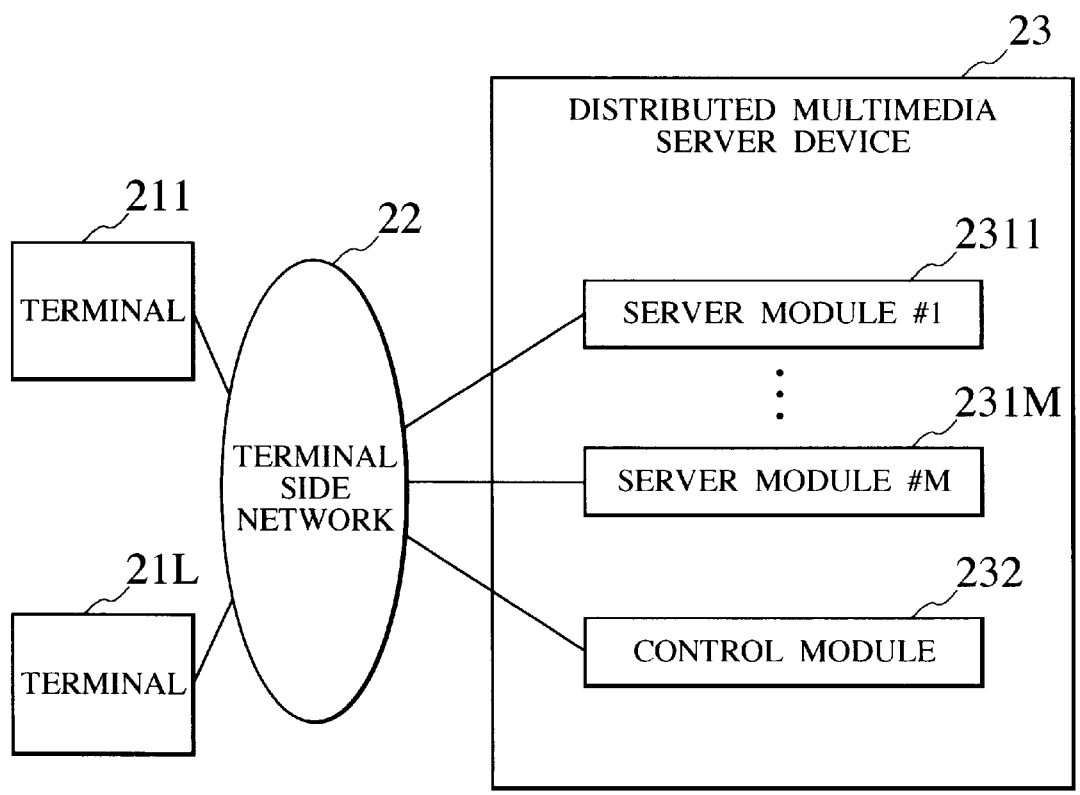
FIG. 2 is a block diagram of a system using a conventional distributed multimedia server device.
Figure 3:
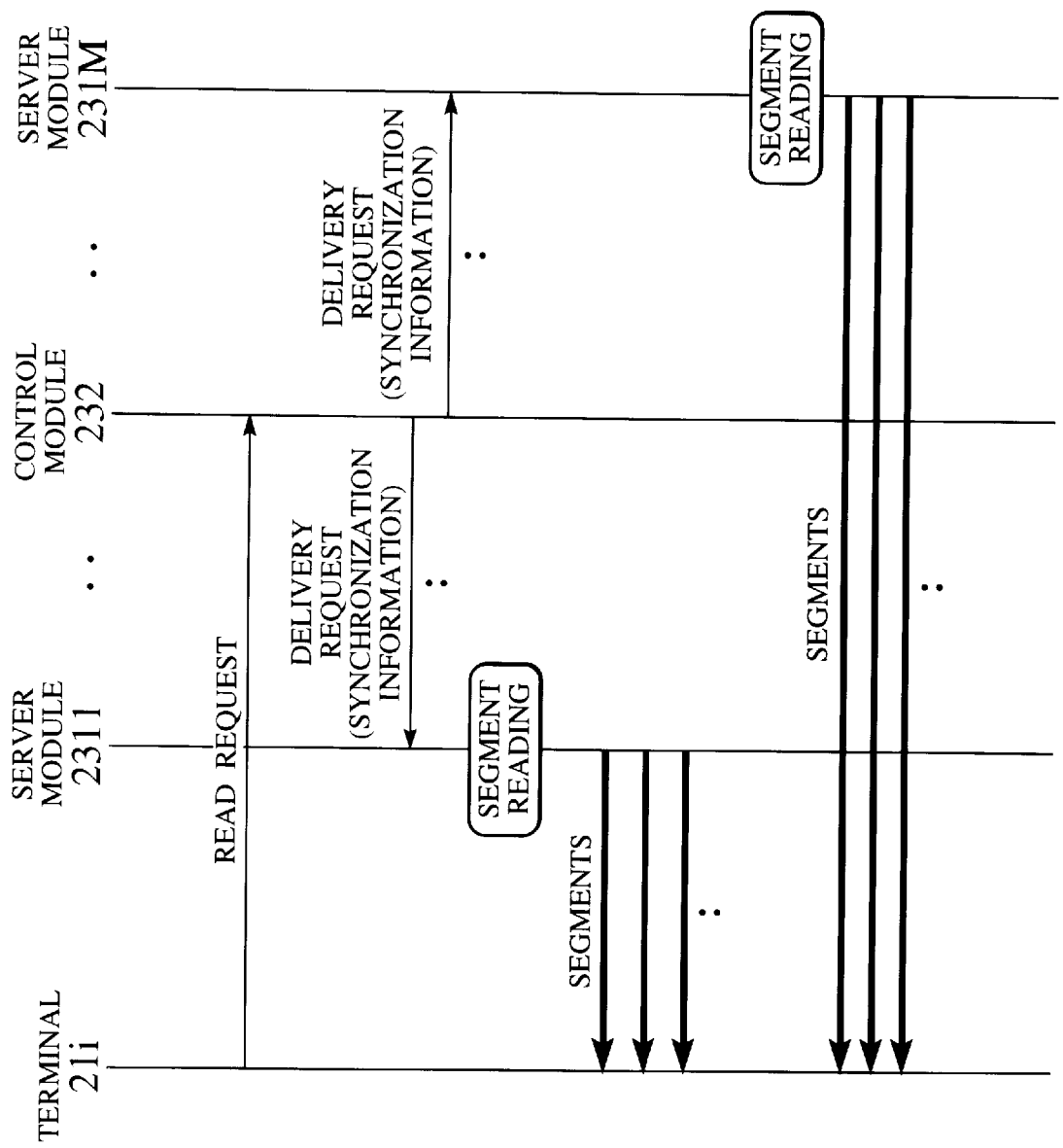
FIG. 3 is a sequence chart for a data read processing by a conventional distributed multimedia server data access method.
Figure 4:
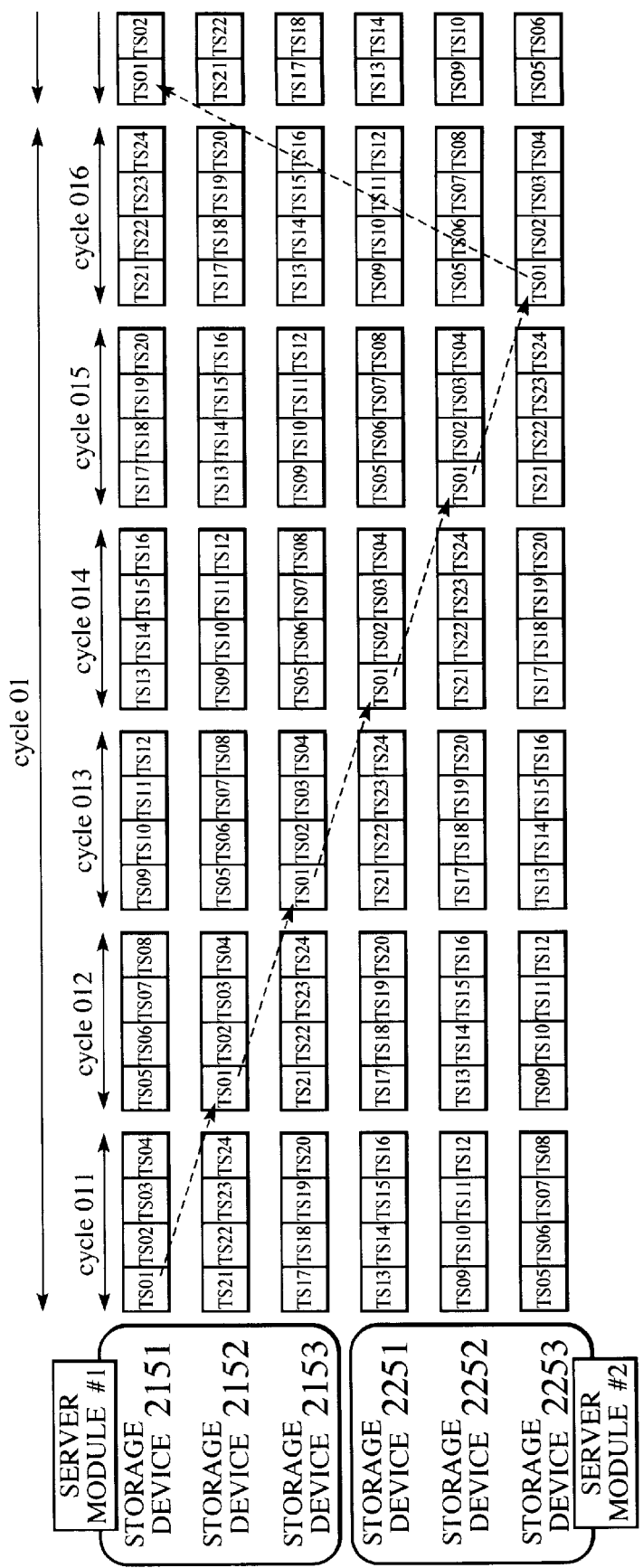
FIG. 4 is a timing chart for a time-slot processing used in a conventional multimedia server data access method.
Figure 5:
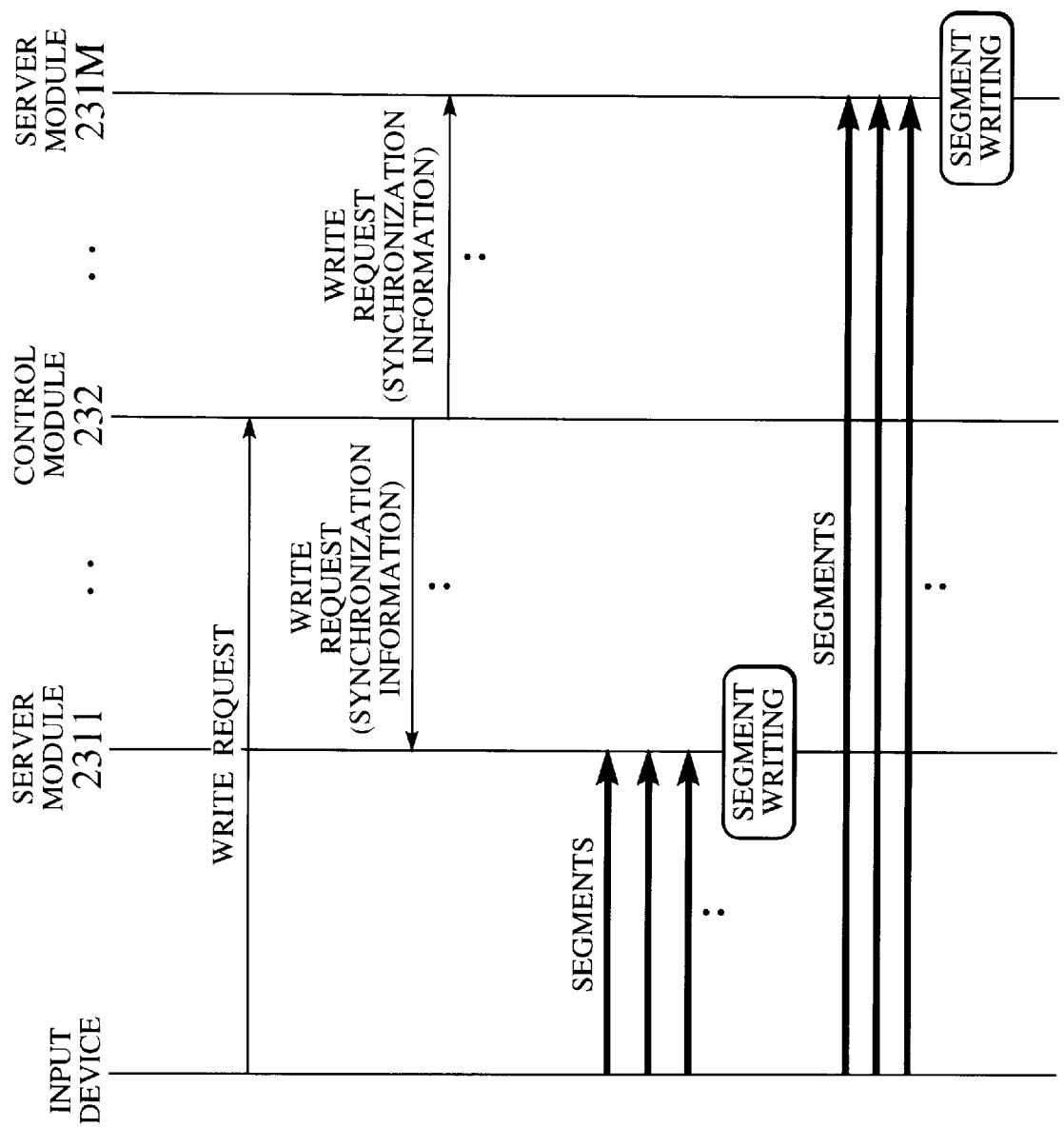
FIG. 5 is a sequence chart for a data write processing by a conventional distributed multimedia server data access method.

FIG. 6 shows a configuration of a system including a distributed multimedia server device of this first embodiment, where the distributed multimedia server device 33 comprises communication server modules 3311 to 331M at the edge of a terminal interface which carry out communications with terminals, storage server modules 3321 to 332N for storing multimedia data and reading the stored multimedia data on demands, and an inter-server module network 333 for supporting communications between the communication server modules and the storage server modules. Similarly as in FIG. 2, the system also includes terminals 211 to 21L and a terminal side network 22.

Note here that the terminal interface is an interface between the terminals and the communication server modules which are provided separately from a communication interface between the communication server modules and the storage server modules in this first embodiment so that various types of terminal interface can be supported by suitably adapting the terminal interface side of the communication server modules without requiring any change in the storage server modules.

FIG. 7 shows an internal configuration of each one of the communication server modules 3311 to 331M, which comprises a communication control unit 11, a central control unit 12, a memory unit 13, a system bus 14, and an inter-server module communication control unit 41 for controlling communications with the other server modules via the inter-server module network 333.

FIG. 8 shows an internal configuration of each one of the storage server modules 3321 to 332N, which comprises a storage unit 15, a central control unit 16, a memory unit 17, a system bus 18, and an inter-server module communication control unit 42 for controlling communications with the communication server modules 3311 to 331M via the inter-server module network 333.

Figure 1:
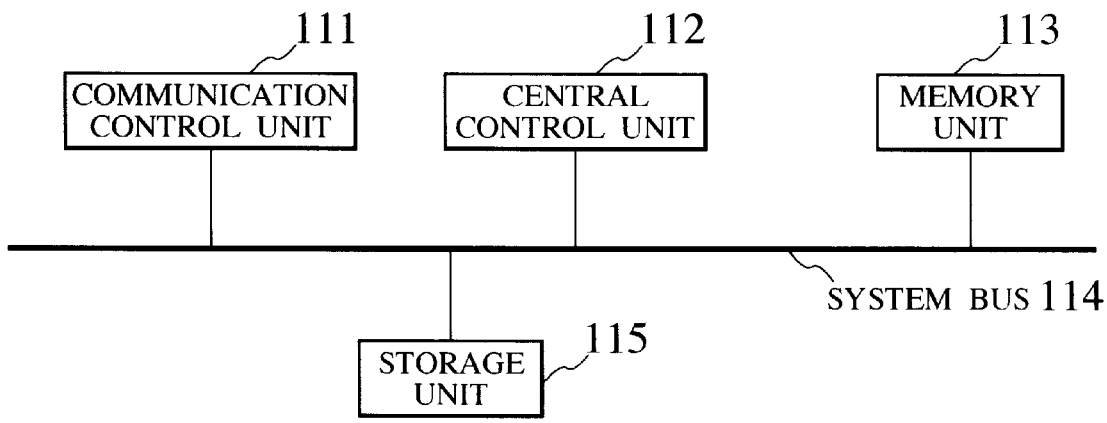
FIG. 1 is a schematic block diagram of a conventional single multimedia server device.

In comparison with the conventional single multimedia server device of FIG. 1 described above, the communication server module of FIG. 7 does not have anything corresponding to the storage unit 115 of FIG. 1 but has the inter-server module communication control unit 41 instead, and the storage server module of FIG. 8 does not have anything corresponding to the communication control unit 111 of FIG. 1 but has the inter-server module communication control unit 42 instead.

The inter-server module network 333 is only required to be able to transfer data between arbitrary server modules at high speed, and can be realized by any of ATM switch, high speed LAN, FDDI, Fiber Channel, Ethernet, etc. For the actual realization of this inter-server module network 333, any suitable known technique can be utilized so that its details will be omitted here.

This system of FIG. 6 can flexibly deal with a case where a number of terminals to be connected simultaneously is increased or a case where a processing load on the distributed multimedia server device 33 is increased by additionally providing a communication server module or a storage server module, or both. For example, it is possible to urge a system manager to additionally provide a communication server module and/or a storage server module by indicating a system load state, or it is possible to make it such that a number of communication server modules and/or a number of storage server modules are changed automatically according to the system load state.

The multimedia data for one program is divided into fixed length multimedia blocks, and distributedly stored over a plurality of storage server modules 3321 to 332N.

In this system of FIG. 6 as described above, the following operations are carried out.

(1) A connection request is made from one terminal 21$i$ (i=1 to L) to an arbitrary communication server module 332$j$ (j=1 to M) via the terminal side network 22.

(2) When the communication server module 331$j$ has a sufficient margin in its processing power to handle a new processing requested from the terminal 21$i$, the communication server module 331$j$ returns a connection response to the terminal 21$i$ and thereby a connection between the terminal 21$i$ and the communication server module 331$j$ is set up so that this connection will be used for the subsequent multimedia data delivery, etc.

Here, when the communication server module 331*j* does not have a sufficient margin in its processing power, a connection reject response containing an identifier of another communication server module which has a sufficient margin in its processing power is returned to the terminal 21*i*. This can be realized by notifying whether each communication server module has a sufficient margin in its processing power or not among the communication server modules 3311 to 331M, for example.

The terminal 21*i* which received this connection reject response then makes a connection request with respect to that another communication server module 331*j'* that has a sufficient margin in its processing power which is corresponding to the Identifier contained in the connection reject response.

(3) The terminal 21*i* issues makes a multimedia data read request containing a program identifier with respect to the communication server module 331*j*.

(4) When this multimedia data read request is received, the communication server module 331*j* issues a multimedia block read request to one storage server module 332*k* (k=1 to N) which has a top multimedia block for the program specified from the terminal 21*i*.

(5) When this multimedia block read request is received, the storage server module 332*k* reads out a specified multimedia block stored in the storage unit 15, and transfers this multimedia block to the communication server module 331*j*. Here, there is no need for the storage server module 332*k* to establish synchronization with respect to the other storage server modules.

(6) When this multimedia block is received, the communication server module 331*j* issues a multimedia block read request to another storage server module which has a next multimedia block for the specified program. Thereafter the multimedia block reading is repeated with respect to a plurality of storage modules similarly.

(7) On the other hand, the communication server module 331*j* periodically delivers the received multimedia block to the terminal 21*i*, using a playback time of one multimedia block as one cycle. Here, there is no need for the communication server module 331*j* to establish synchronization with respect to the other communication server modules.

(8) When there is a disconnection request from the terminal 21*i* to the communication server module 331*j*, the communication server module 331*j* returns a disconnection response to the terminal 21*i* and thereby a connection between the terminal 21*i* and the communication server module 331*j* is disconnected.

Thus in the distributed multimedia server device of this first embodiment, each communication server module maintains only a connection with respect to a terminal to which the multimedia data delivery is to be carried out, and sequentially delivers a plurality of multimedia blocks transferred from a plurality of storage server modules via the inter-server module network in such a manner that a playback interruption does not occur at the terminal, so that there is no need to establish synchronization among any server modules and the utilization efficiency of the terminal side network can be high.

As should be apparent from the above description, the distributed multimedia server device of this first embodiment has the following advantages.

(1) It suffices for each storage server module to transfer a multimedia block according to the read request from the communication server module, and there is no need to establish synchronization with respect to the other storage server modules. Moreover, it suffices for each communication server module to transfer a multimedia block to the terminal at constant interval, without establishing synchronization with respect to the other communication server modules.

(2) The multimedia block delivery is carried out through a connection set that has been set up with respect to a terminal in response to a connection request from that terminal, so that there is no need for the communication server module to always maintain connections with all the terminals, and therefore there is no need for the communication server module to repeat connection set up and release with respect to a plurality of terminals at short time intervals either.

(3) There is no control module for controlling the distributed multimedia server device as a whole, so that there is no possibility for a limitation on a processing power of the distributed multimedia server device as a whole to arise because of a processing neck due to the control module.

(4) Even when the terminal side network or a communication protocol between the terminals and the distributed multimedia server device is changed, its influence is limited to the communication server modules and therefore there is no need to change the distributed multimedia server device as a whole.

(5) The communication server module which has insufficient margin in its processing power can guide the connection request to another communication server module at a time of connection request from a terminal, so that the processing load can be distributed among a plurality of communication server modules, and therefore there is no possibility for a limitation on a processing power of the distributed multimedia server device as a whole to arise because of a processing neck due to a particular communication server module.

(6) The multimedia data of one program is divided into a plurality of fixed length multimedia blocks and distributedly stored over a plurality of storage server modules, so that read requests occur nearly uniformly with respect to the storage server modules and therefore there is no possibility for a limitation on a processing power of the distributed multimedia server device as a whole to arise because of a processing neck due to a particular storage server module.

(7) The distributed multimedia server device is formed from a plurality of server modules so that the multimedia data can be delivered from a single multimedia server device to many terminals simultaneously.

(8) It is possible to flexibly deal with a case where a number of terminals to be connected simultaneously increases or a case where a processing load on the distributed multimedia server device increases, by additionally proving a communication server module or a storage server module, or both.

Referring now to FIG. 9 to FIG. 18, the second embodiment concerning a distributed multimedia server data access method according to the present invention will be described in detail.

Figure 9:
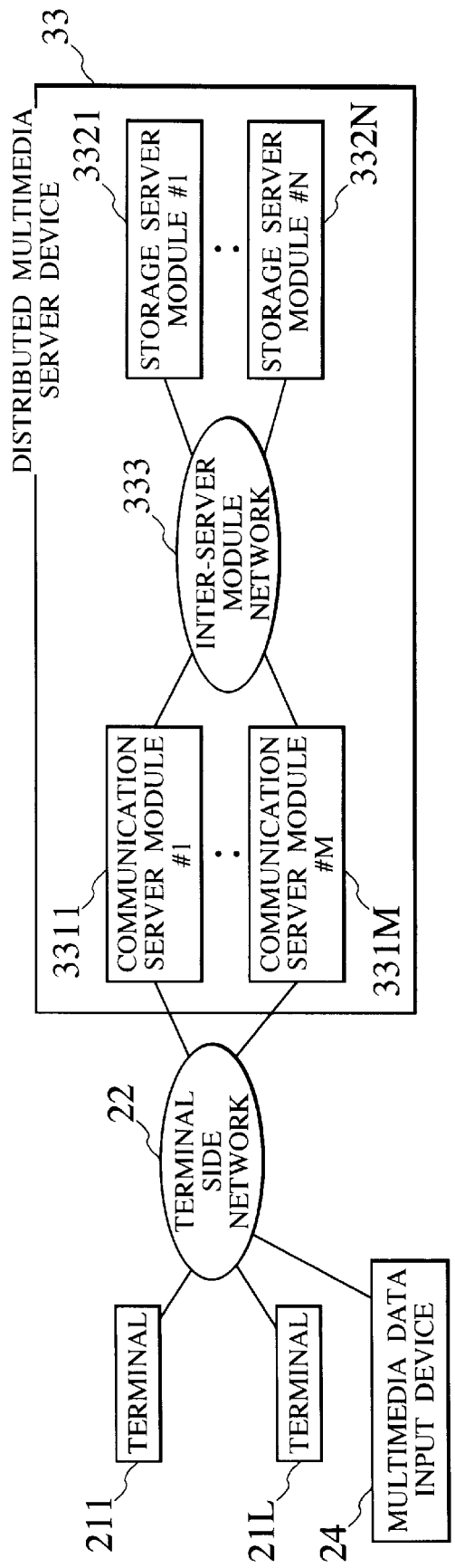
FIG. 9 is a block diagram of a system using a distributed multimedia server device according to the second embodiment of the present invention.

FIG. 9 shows a configuration of a system including a distributed multimedia server device of this second embodiment, in which each one of terminals 211 to 21L issues a multimedia data read request with respect to a distributed multimedia server device 33 via a terminal side network 22 and playbacks received multimedia data, while the terminal side network 22 connects the terminals 211 to 21L and the distributed multimedia server device 33. The distributed multimedia server device 33 comprises communication server modules 3311 to 331M, storage server modules 3321 to 332N, and an inter-server module network 333 similarly as in the first embodiment described above.

In addition, there is provided a multimedia data input device 24 for issuing a multimedia data write request with respect to the distributed multimedia server device 33 via the terminal side network 22 in order to store multimedia data in the distributed multimedia server device 33.

Here, the multimedia data for one program is to be divided into fixed length segments and stored cyclically among the server modules 3311 to 331M.

Figure 10:
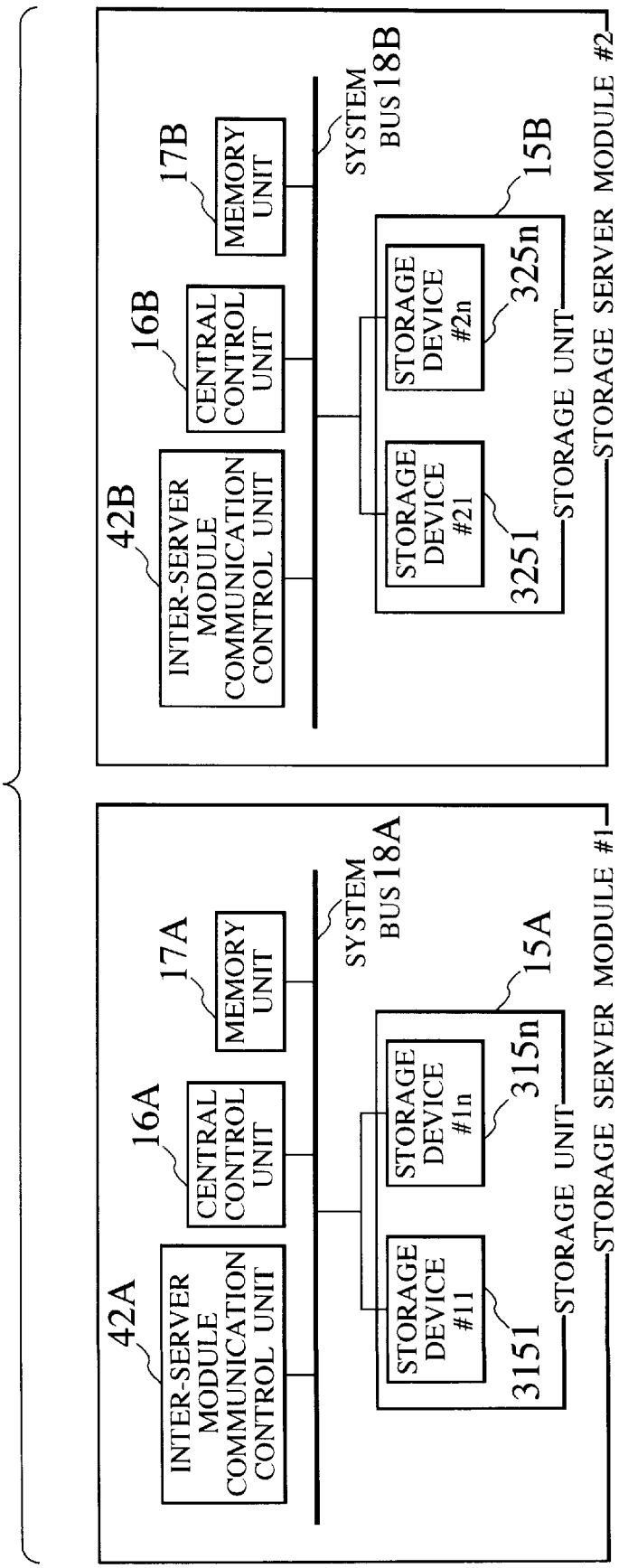
FIG. 10 is a schematic block diagram of two storage server modules in the distributed multimedia server device of FIG. 9 for an exemplary case.

FIG. 10 shows a configuration of two storage server modules #1 and #2 for an exemplary case of forming the distributed multimedia server device 33 using only two storage server modules, where the inter-server module communication control unit 42A or 42B carries out communications with the communication server modules, and the central control units 16A or 16B controls the entire storage server module, while the storage unit 15A or 15B stores multimedia data and the memory unit 17A or 17B temporarily stores multimedia data read out from the storage unit 15A or 15B, and the system bus 18A or 18B supports data transfers among the inter-server module communication control unit 42A/42B, the central control unit 16A/16B, the memory unit 17A/17B and the storage unit 15A/15B. In this second embodiment, the storage unit 15A or 15B is formed by a plurality of storage devices 3151 to 315$n$ or 3251 to 325$n$.

Figure 11:
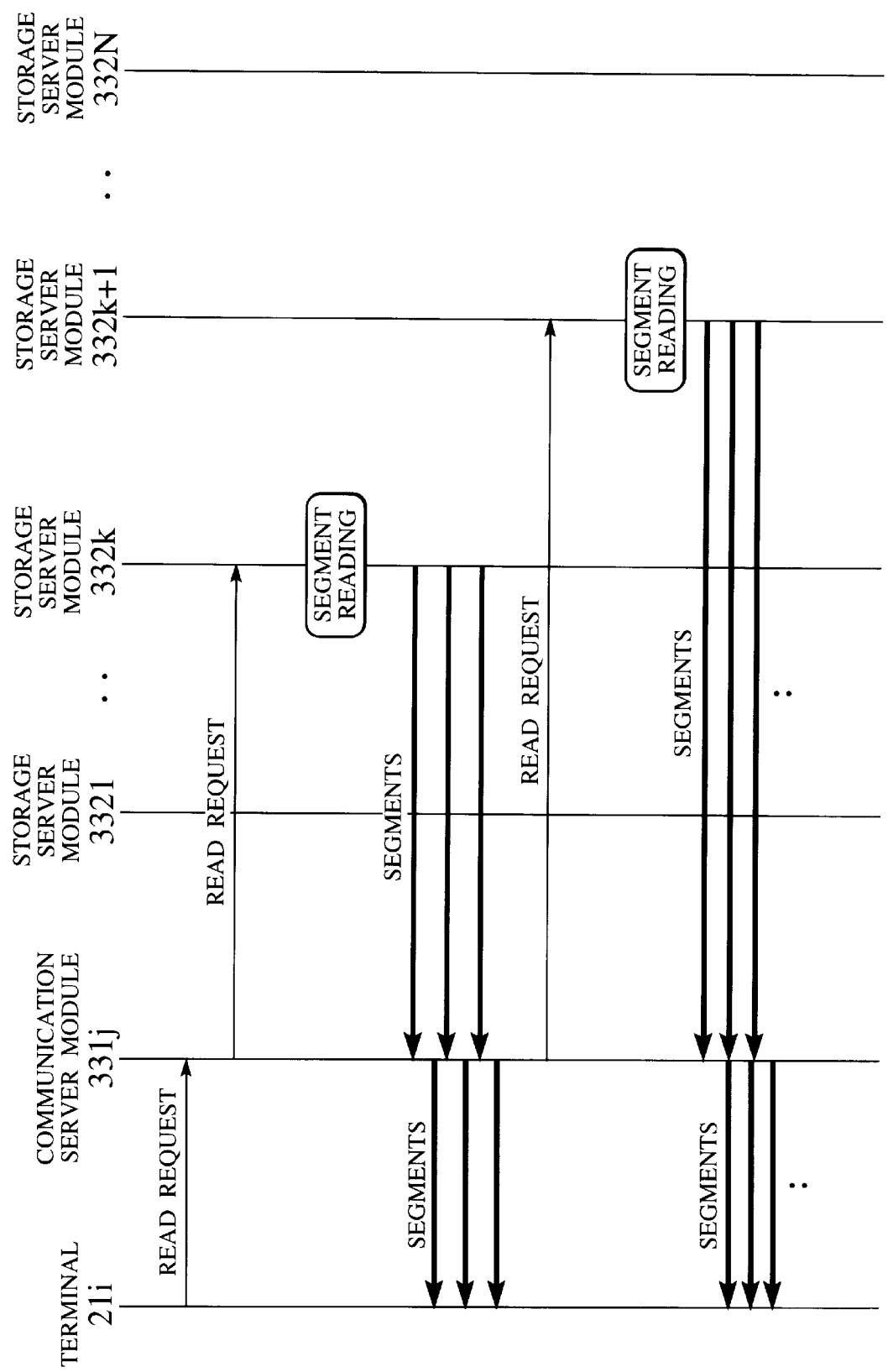
FIG. 11 is a sequence chart for a data read processing by a distributed multimedia server data access method according to the second embodiment of the present invention.

FIG. 11 shows a sequence chart for the data read processing according to the distributed multimedia server data access method of this second embodiment in the system of FIG. 9, which proceeds as follows.

(1) A read request for a certain program from a terminal 21$i$ is received at the communication server module 331$j$.

(2) The communication server module 331$j$ issues a read request to a storage server module 332$k$ that stores a top segment of the requested program.

(3) The storage server module 332$k$ reads out segments stored therein without making communications with any other storage server modules and transfers the read out segments to the communication server module 331$j$, and then the communication server module 331$j$ delivers the segments transferred from the storage server module 332$k$ to the terminal 21$i$.

(4) After receiving a plurality of consecutive segments stored in the storage server module 332$k$, the communication server module 331$j$ issues a read request to a storage server module 332$k$+1 that stores subsequent segments.

(5) The storage server module 332$k$+1 reads out segments stored therein without making communications with any other storage server modules and transfers the read out segments to the communication server module 331$j$, similarly the storage server module 332$k$ in (3), and then the communication server module 331$j$ delivers the segments transferred from the storage server module 332$k$+1 to the terminal 21$i$.

(6) Thereafter, similarly, each storage server module that received a read request from the communication server module reads out segments stored therein without making communications with any other storage server modules and delivers the read out segments to the terminal via the communication server module.

Figure 12:
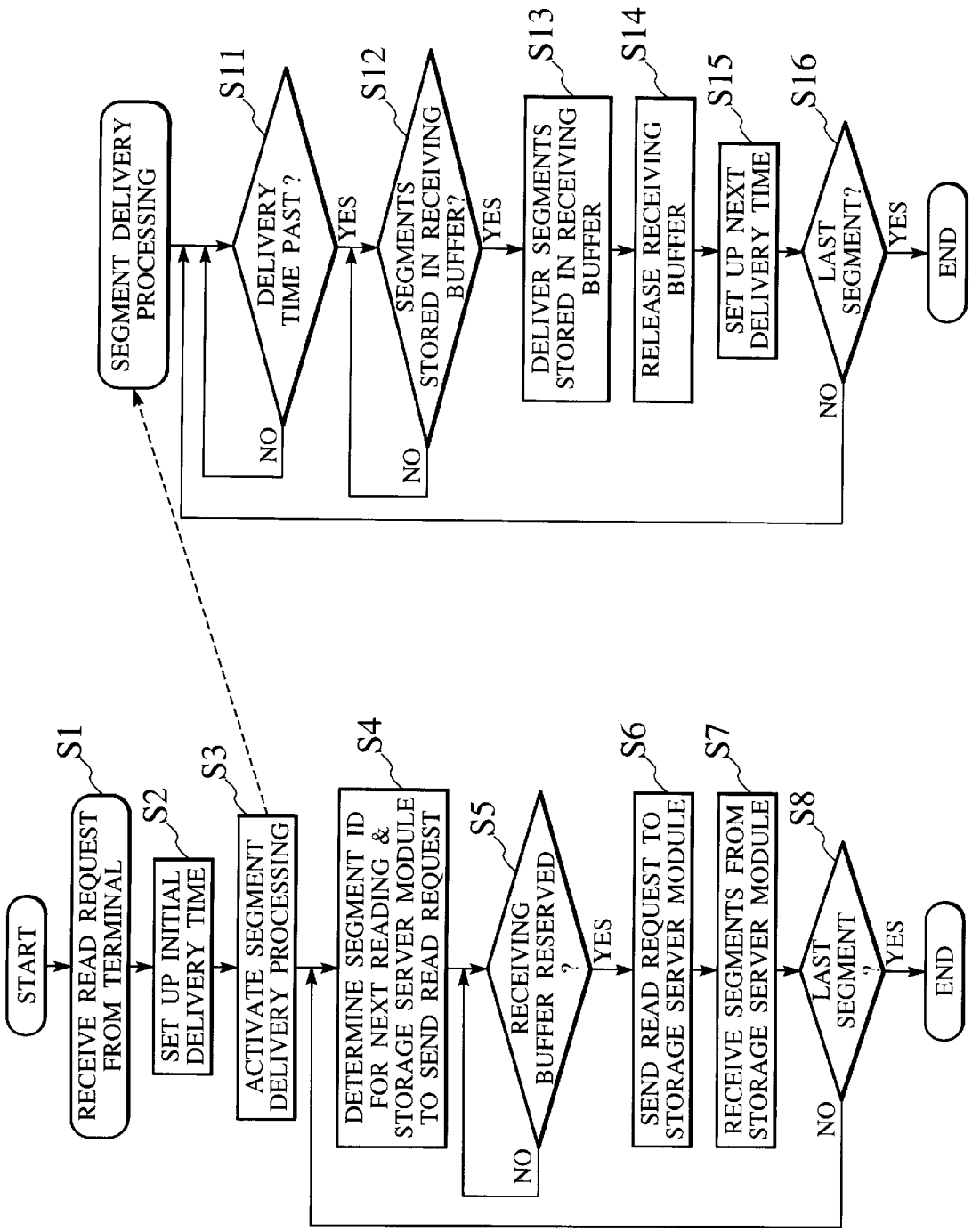
FIG. 12 is a flow chart for a processing by a communication server module in the data read processing of FIG. 11.

FIG. 12 shows a flow chart for the processing at the communication server module according to the distributed multimedia server data access method of this second embodiment, which proceeds as follows.

(S1) A read request from a terminal is received.

(S2) An initial delivery time for the multimedia data delivery with respect to the terminal is set up. For example, the initial delivery time is set to be a time at which the read request is received from the terminal so that segments are delivered to the terminal when segments are received from the storage server module.

(S3) The segment delivery processing to be described below is activated so that the segment delivery processing will be carried out in parallel to the following steps S4 to S8.

(S4) A segment ID of a next segment to be read out and a storage server module in which the next segment is stored to which a read request is to be sent next are determined.

(S5) A receiving buffer for storing segments to be transferred from that storage server module is reserved. When a receiving buffer cannot be reserved immediately, the processing is kept waiting until it becomes possible to reserve a receiving buffer. Here, one receiving buffer has a size equal to that of one segment, and it is possible to use a plurality of receiving buffers for one terminal.

(S6) A read request is issued with respect to the storage server module determined at (S4).

(S7) Segments corresponding to the read request are received from the storage sever module and stored into the receiving buffer.

(S8) If it is not the last segment, the processing returns to (S4) described above to determine a segment ID of a next segment to be read out and a storage server module in which the next segment is stored to which a read request is to be sent next. Thereafter the processing of (S4) to (S7) described above is repeated.

In parallel to the above processing, the segment delivery processing activated at (S3) described above is also carried out as follows.

(S11) The processing is kept waiting until a delivery time with respect to the terminal that was set up has past. Here, the processing waits until the delivery time has past in order to account for cases where the segment transfer from the storage server module to the communication server module is delayed due to the storage server module side cause (such as time-slot acquisition failure) or the congestion in the inter-server module network.

(S12) The processing is kept waiting until the read out segments are stored into the receiving buffer. In a case of using more than one receiving buffers, the processing proceeds to (S13) if there is at least one receiving buffer to which the segment has been stored.

(S13) The segment stored in the receiving buffer is delivered to the terminal.

(S14) The receiving buffer is released.

(S15) A next delivery time is set up by adding a playback time for one segment at the terminal to the currently set delivery time.

(S16) If it is not the last segment, the processing col returns to (S11) described above. Thereafter, the processing of (S11) to (S15) described above is repeated.

According to this processing of FIG. 12, the communication server module sequentially issues read requests to the storage server modules at such timings that no interruption is expected to occur in a program playback at the terminal provided that no trouble occurs in the segment delivery between the storage server module and the terminal. Note however that the interruption of a program playback at the terminal could be caused if there is a delay in the segment delivery from the storage server module to the communication server module due to the storage server module side cause (such as time-slot acquisition failure) or the congestion in the inter-server module network. Moreover, the interruption of a program playback at the terminal could also be caused by the terminal side cause (such as flow control applied when the receiving buffer on the terminal side becomes full). In this regard, the occurrence of the interruption of a program playback at the terminal can be prevented as much as possible by sending a plurality of segments from the communication server module to the terminal while no flow control due to the terminal side cause is applied.

Figure 13:
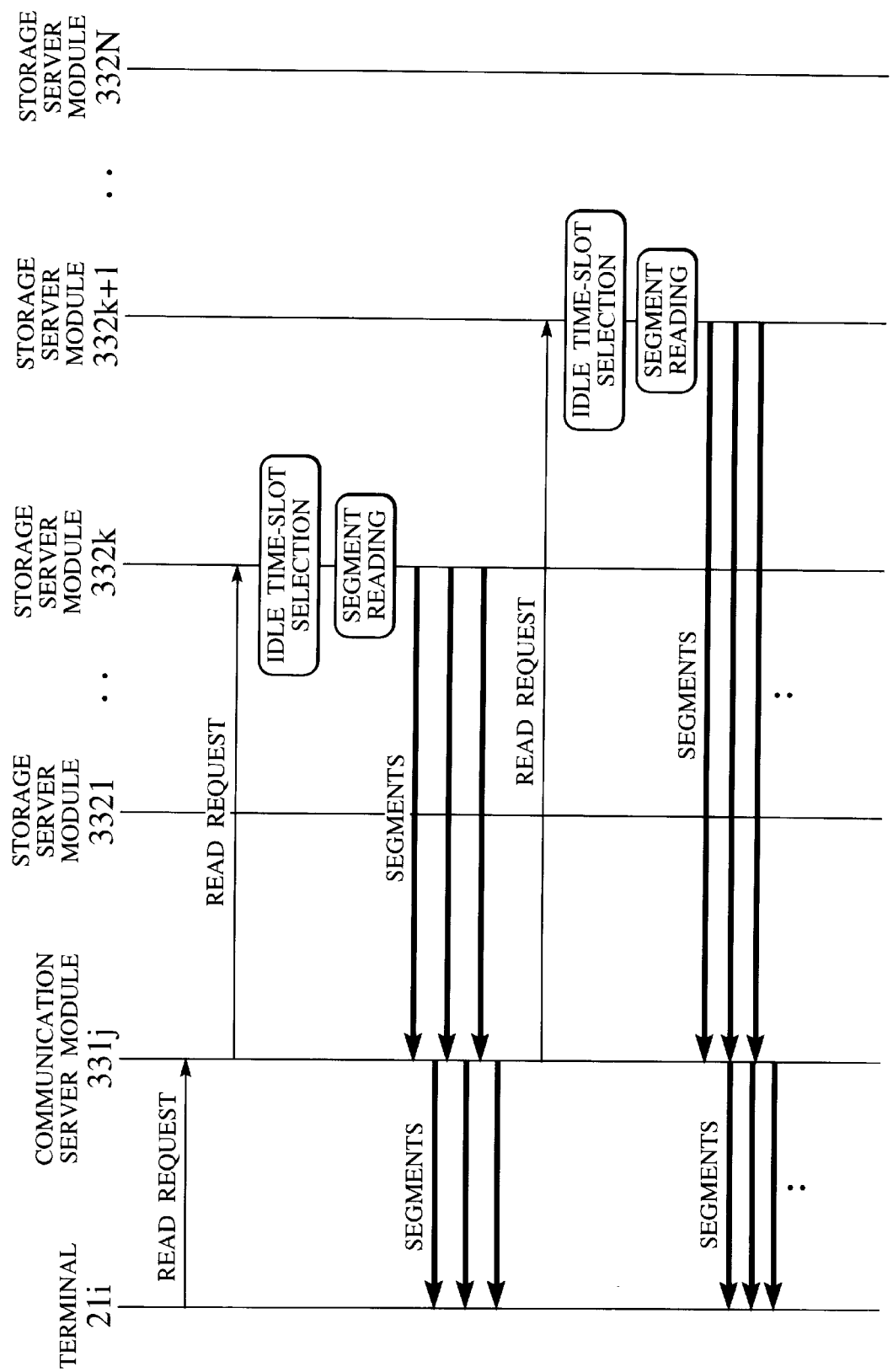
FIG. 13 is a sequence chart for a data read processing by a distributed multimedia server data access method according to the second embodiment of the present invention using time-slots.

FIG. 13 shows a sequence chart for the data read processing according to the distributed multimedia server data access method of this second embodiment using timeslots, in a case where each one of the storage server modules 3321 to 332N manages its own time-slots alone, which proceeds as follows.

(1) A read request for a certain program from a terminal 21$i$ is received at the communication server module 331$j$.

(2) The communication server module 331$j$ issues a read request to a storage server module 332$k$ that stores a top segment of the requested program.

(3) The storage server module 332$k$ selects an idle time-slot and reads out segments stored therein without notifying the selected time-slot to any other storage server modules, and transfers the read out segments to the communication server module 331$j$, and then the communication server module 331$j$ delivers the segments transferred from the storage server module 332$k$ to the terminal 21$i$.

(4) After receiving a plurality of consecutive segments stored in the storage server module 332$k$, the communication server module 331$j$ issues a read request to a storage server module 332$k$+1 that stores subsequent segments.

(5) The storage server module 332$k$+1 selects an idle time-slot and reads out segments stored therein without notifying the selected time-slot to any other storage server modules, and transfers the read out segments to the communication server module 331$j$, and then the communication server module 331$j$ delivers the segments transferred from the storage server module 332$k$+1 to the terminal 21$i$.

(6) Thereafter, similarly, each storage server module that received a read request from the communication server module selects an idle time-slot at that point and reads out segments stored therein without notifying the selected time-slot to any other storage server modules, and delivers the read out segments to the terminal via the communication server module.

Figure 14:
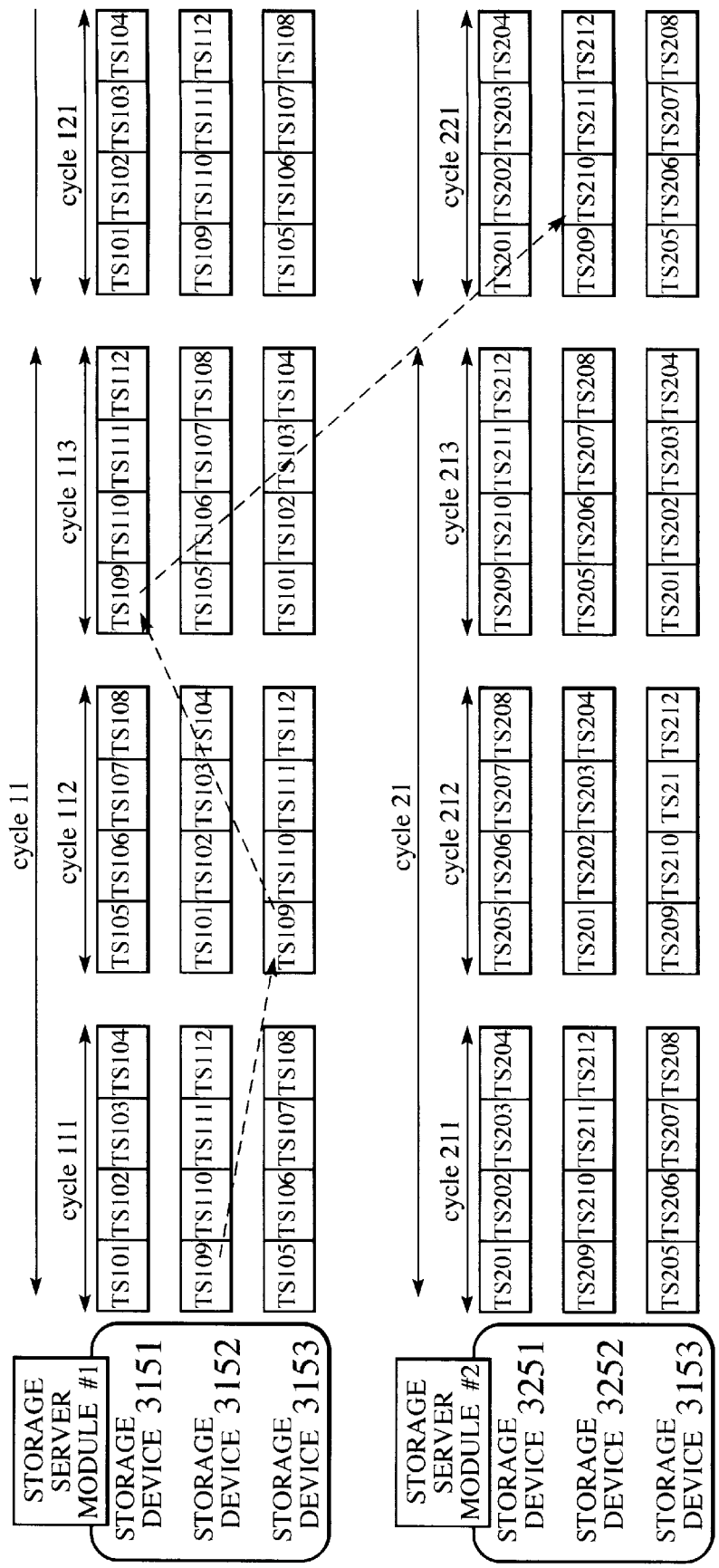
FIG. 14 is a timing chart for a time-slot processing used in a multimedia server data access method according to the second embodiment of the present invention, for an exemplary case of FIG. 10.

FIG. 14 shows a timing chart for the time-slot processing used in the multimedia server data access method of this second embodiment, for an exemplary case of using two storage server modules in the distributed multimedia server device as shown in FIG. 10 where each of the two storage server modules has three storage devices 3151 to 3153 and 3251 to 3253 respectively.

In this case, three time-slot sequences comprising twelve time-slots TS101, TS102, . . . , TS112 of the equal interval are periodically generated in the storage devices 3151 to 3153 of the storage server module #1, while three time-slot sequences comprising twelve time-slots TS201, TS202, . . . , TS212 of the equal interval are periodically generated in the storage devices 3251 to 3253 of the storage server module #2. Here, the time-slots TS101 to TS112 of the storage server module #1 and the time-slots TS201 to TS212 of the storage server module #2 are independent of each other, and managed only by the respective storage server modules.

In the storage server module #j (i=1, 2), each one of cyclej11, cycleJ12, cyclej13, cyclej21, etc. indicates a period for reading four time-slots constituting the time-slot sequence (a sub-cycle), and cyclej1 indicates a period for reading twelve time-slots constituting the time-slot sequence (a cycle), where one cycle comprises three sub-cycles and the time-slot sequences have phases which are sequentially displaced by one sub-cycle. Here, the sub-cycles cycle111, cycle112 and cycle 113 of the storage server module #1 and the sub-cycles cycle211, cycle212 and cycle213 are independent of each other.

In this case, segments are cyclically stored in the storage devices 3151, 3152 and 3153 of the server module #1 and the storage devices 3251, 3252 and 3253 of the server module #2. Thus, segments may be stored in the storage devices 3152, 3153 and 3151 of the storage server module #1, and then in the storage devices 3252, 3253 and 3251 of the storage server module #2, for example.

Figure 15:
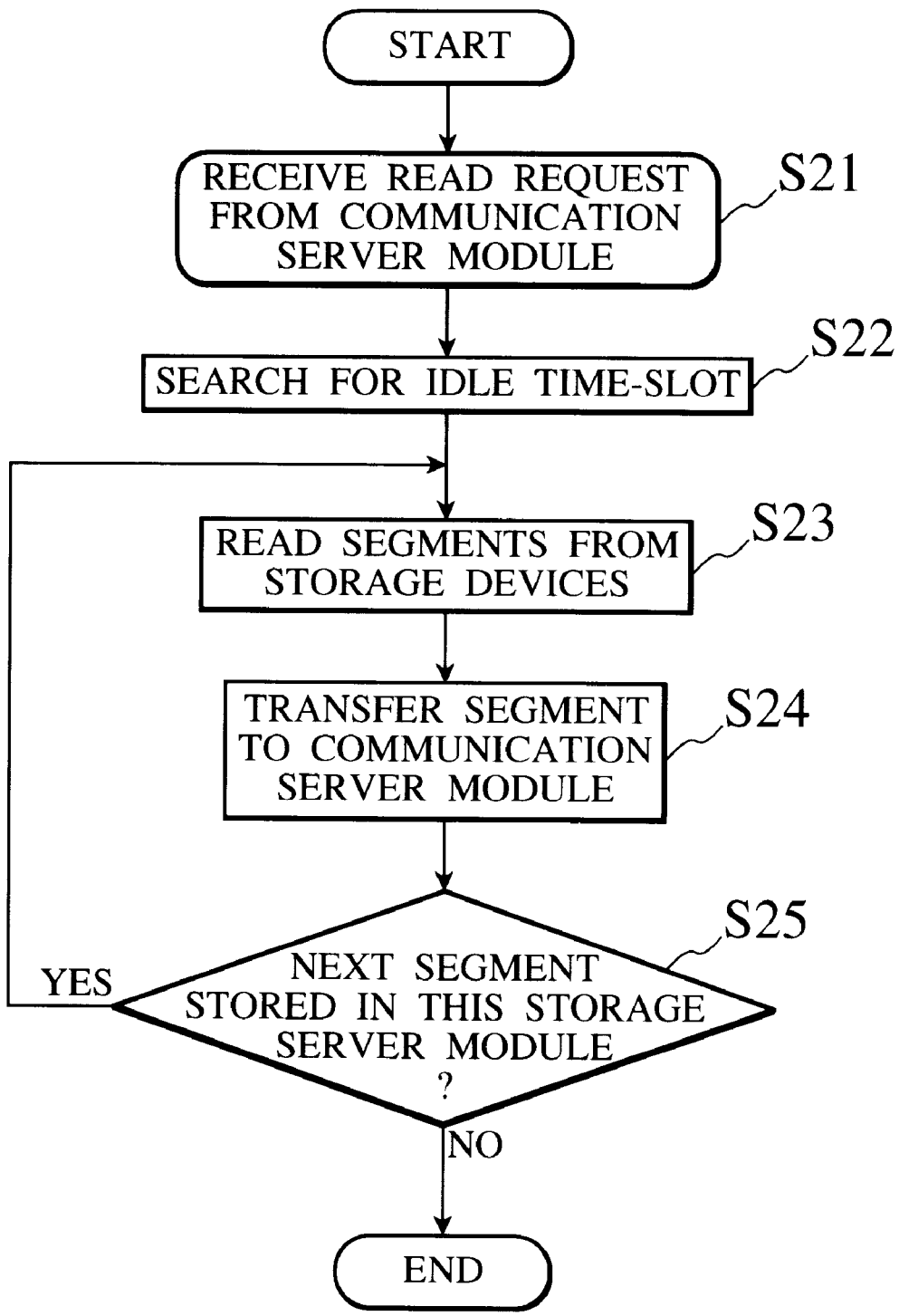
FIG. 15 is a flow chart for a read processing by a storage server module for an exemplary case of using the time-slot processing of FIG. 14.

FIG. 15 shows a flow chart for the read processing at the storage server module according to the distributed multimedia server data access method of this second embodiment for a case of using a timing chart of FIG. 14, which proceeds as follows.

When there is a read request for a certain program from a terminal and a top segment of that program is stored in the storage device 3152 of the storage server module #1, the storage server module #1 receives a read request for this certain program from a communication server module (S21).

Then, the storage server module #1 searches for an idle time-slot which is currently not used by the other read processing or write processing, sequentially in an order of TS109, TS110, . . . , so as to find a time-slot to be used in reading segments of the requested program (S22).

When TS109 is an idle time-slot, for example, the storage server module #1 reads out a segment stored in the storage device 3152 at a timing of the time-slot TS109 in the sub-cycle cycle111 (S23). Then, the read out segment is transferred to the communication server module (S24), and whether a next segment is stored in this storage server module #1 or not is judged (S25). If so, the processing returns to the step S23 and the processing of the steps S23 to S25 is repeated for the next segment.

In an exemplary case of FIG. 14, the storage server module #1 reads out a segment stored in the storage device 3153 at a timing of the same time-slot TS109 in the next sub-cycle cycle112 and transfer the read out segment to the communication server module, and then reads out a segment stored in the storage device 3151 at a timing of the same time-slot TS109 in the next sub-cycle cycle113 and transfers the read out segment to the communication server module. After that, a next segment is not stored in this storage server module #1 so that the read processing at the storage server module #1 is finished.

Then, the storage server module #2 receives a read request for the requested program from the communication server module, and searches for an idle time-slot. When TS210 is an idle time-slot, for example, the storage server module #2 reads out a segment stored in the storage device 3252 at a timing of the time-slot TS210 in the sub-cycle cycle221 and the read out segment is transferred to the communication server module. Then, the storage server module #2 reads out a segment stored in the storage device 3253 at a timing of the same time-slot TS210 in the next sub-cycle cycle222 and transfer the read out segment to the communication server module, and then reads out a segment stored in the storage device 3251 at a timing of the same time-slot TS210 in the next sub-cycle cycle223 and transfers the read out segment to the communication server module.

Thereafter, the processing returns to the storage server module #1 and the search of a new idle time-slot and the read processing using the found idle time-slot is similarly repeated.

Figure 16:
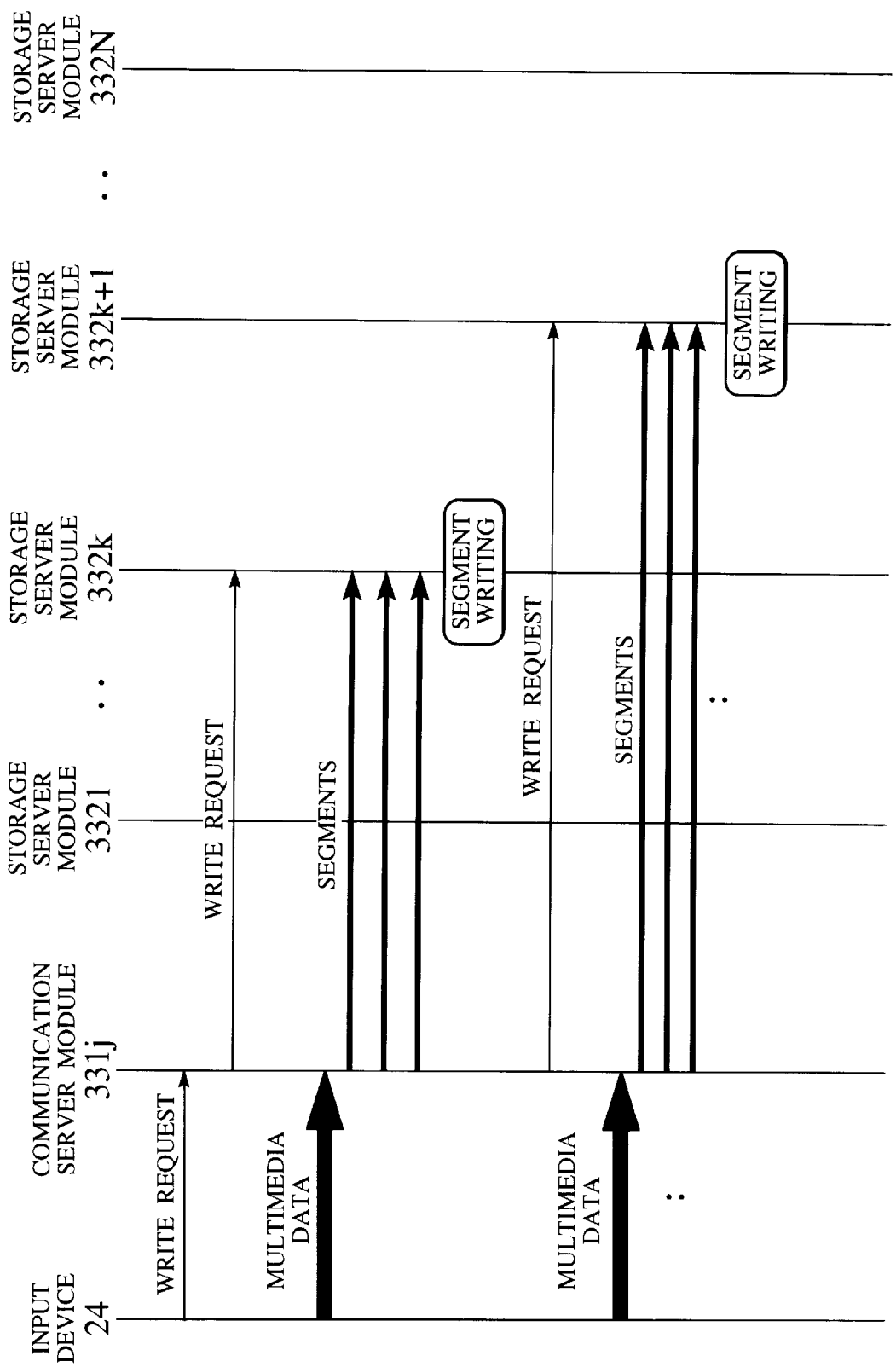
FIG. 16 is a sequence chart for a data write processing by a distributed multimedia server data access method according to the second embodiment of the present invention.

FIG. 16 shows a sequence chart for the data write processing according to the distributed multimedia server data access method of this second embodiment in the system of FIG. 9, which proceeds as follows.

(1) A write request for a certain program from the multimedia data input device 24 is received at the communication server module 331j.

(2) The communication server module 331j determines a storage server module 332k for storing a top segment of the requested program, and issues a write request to the determined storage server module 332k.

(3) The communication server module 331j divides the multimedia data transferred from the multimedia data input device 24 into fixed length segments, and transfers these segments to the storage server module 332k.

(4) The storage server module 332k writes the transferred segments into its storage unit, without making communications with any other storage server modules.

(5) Thereafter, the communication server module 331j repeats the similar processing by sequentially determining the storage server modules to store segments in a cyclic order such as the storage server modules 332k+1, 332k+2, and so on, dividing the multimedia data transferred from the multimedia data input device 24 into fixed length Oct segments, and transferring these segments to the determined storage server modules.

Figure 17:
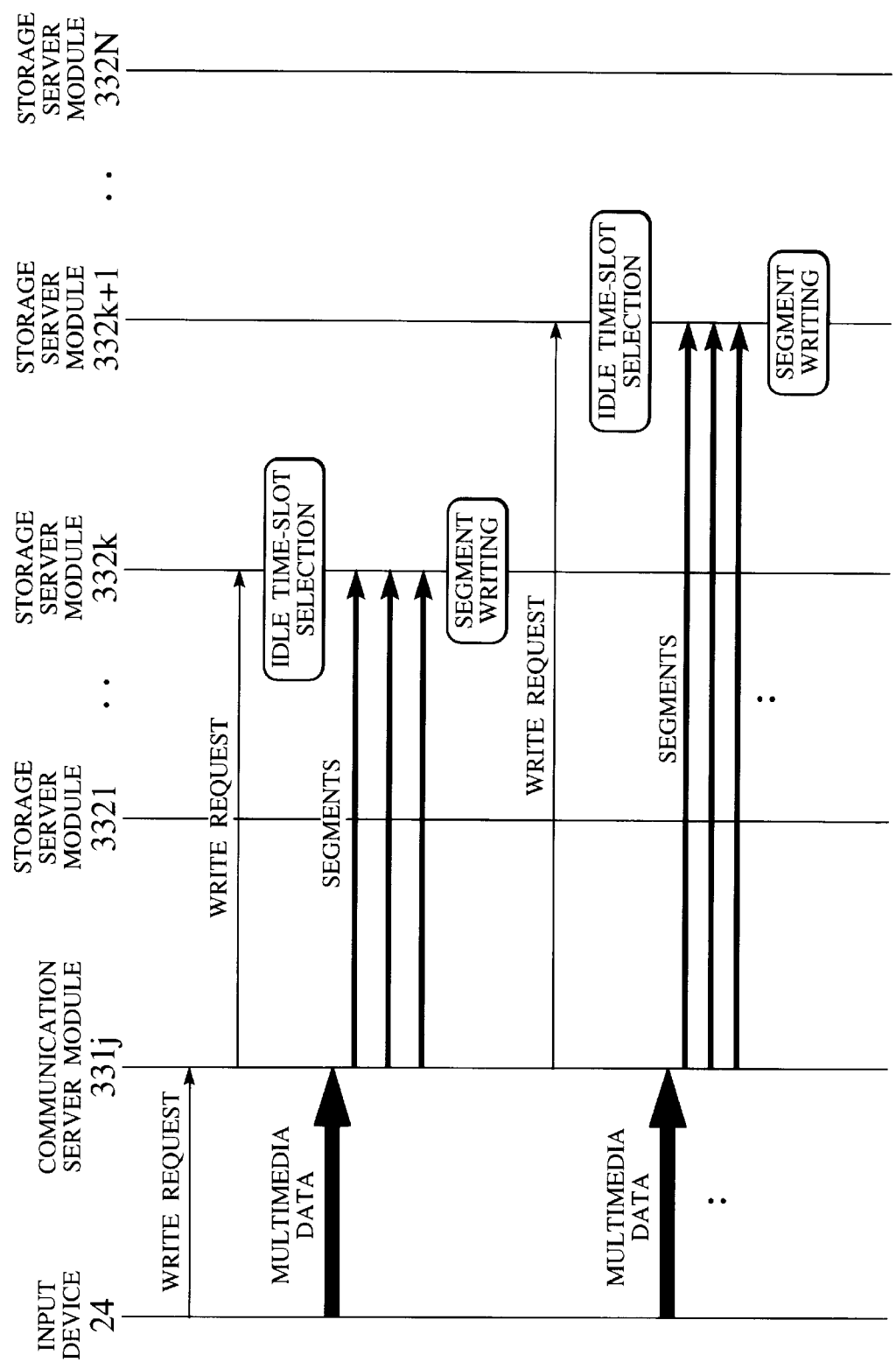
FIG. 17 is a sequence chart for a data write processing by a distributed multimedia server data access method according to the second embodiment of the present invention using time-slots.

FIG. 17 shows a sequence chart for the data write processing according to the distributed multimedia server data access method of this second embodiment using time-slots, in a case where each one of the storage server modules 3321 to 332N manages its own time-slots alone, which proceeds as follows.

(1) A write request for a certain program from the multimedia data input device 24 is received at the communication server module 331j.

(2) The communication server module 331j determines a storage server module 332k for storing a top segment of the requested program, and issues a write request to the determined storage server module 332k.

(3) The storage server module 332k selects an idle time-slot.

(4) The communication server module 331j divides the multimedia data transferred from the multimedia data input device 24 into fixed length segments, and transfers these segments to the storage server module 332k.

(4) The storage server module 332k writes the transferred segments into its storage unit, according to the selected time-slot.

(5) Thereafter, the communication server module 331j repeats the similar processing by sequentially determining the storage server modules to store segments in a cyclic order such as the storage server modules 332k+1, 332k+2, and so on, dividing the multimedia data transferred from the multimedia data input device 24 into fixed length segments, and transferring these segments to the determined storage server modules.

In this case of data write processing, a timing chart for the time-slot processing used in the multimedia server data access method of this second embodiment is the same as that of FIG. 14, and segments are to be stored cyclically into the storage devices within the storage server module. For example, segments are to be stored in an order of the storage devices 3152, 3153 and 3151 of the storage server module #1, and then in the storage devices 3252, 3253 and 3251 of the storage server module #2.

Figure 18:
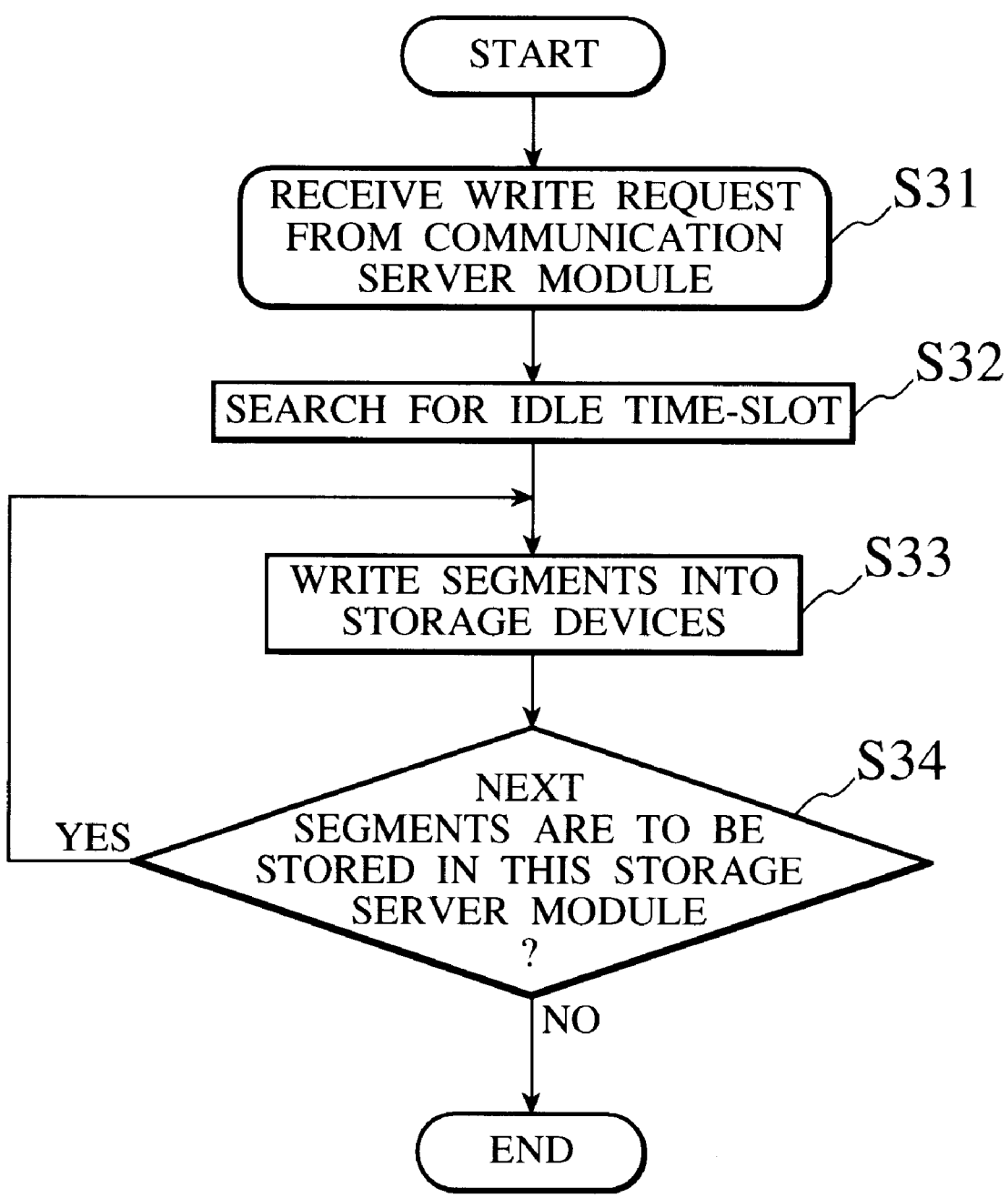
FIG. 18 is a flow chart for a write processing by a storage server module for an exemplary case of using the time-slot processing of FIG. 14.

FIG. 18 shows a flow chart for the write processing at the storage server module according to the distributed multimedia server data access method of this second embodiment for a case of using a timing chart of FIG. 14, which proceeds as follows.

When there is a write request for a certain program from the multimedia data input device 24 and a top segment of that program is to be stored in the storage device 3152 of the storage server module #1, the storage server module #1 receives a write request for this certain program from a communication server module (S31).

Then, the storage server module #1 searches for an idle time-slot which is currently not used by the other read processing or write processing, sequentially in an order of TS109, TS110, . . . , so as to find a time-slot to be used in writing segments of the requested program (S32).

When TS109 is an idle time-slot, for example, the storage server module #1 writes a segment into the storage device 3152 at a timing of the time-slot TS109 in the sub-cycle cycle111 (S33), and whether a next segment is to be stored in this storage server module #1 or not is judged (S34). If so, the processing returns to the step S33 and the processing of the steps S33 and S34 is repeated for the next segment.

In an exemplary case of FIG. 14, the storage server module #1 writes a segment into the storage device 3153 at a timing of the same time-slot TS109 in the next sub-cycle cycle112, and then writes a segment into the storage device 3151 at a timing of the same time-slot TS109 in the next sub-cycle cycle113. After that, a next segment is not to be stored in this storage server module #1 so that the write processing at the storage server module #1 is finished.

Here, the next segment is to be stored into the storage device 3252 of the storage server module #2, so that the storage server module #2 receives a write request for the requested program from the communication server module, and searches for an idle time-slot. When TS210 is an idle time-slot, for example, the storage server module #2 writes a segment into the storage device 3252 at a timing of the time-slot TS210 in the sub-cycle cycle221, writes a segment into the storage device 3253 at a timing of the same time-slot TS210 in the next sub-cycle cycle222, and then writes a segment into the storage device 3251 at a timing of the same time-slot TS210 in the next sub-cycle cycle223.

Thereafter, the processing returns to the storage server module #1 and the search of a new idle time-slot and the write processing using the found idle time-slot is similarly repeated.

As described, according to the distributed multimedia server data access method of this second embodiment, the following advantages can be achieved.

(1) There is no need to notify the synchronization information to all the storage server module.

In a case of the data read processing shown in FIG. 11, even when the terminal issues a read request for another program or a visual search request such as that for jumping to another playback position within the same program, before the reading is completed up to the end of a certain program, there is no need to notify a new synchronization information along with a request for interrupting an access according to the previously notified synchronization information with respect to all the storage server modules.

In addition, when a visual search request from a terminal is received, the communication server module interrupts the delivery of the previous program to a terminal and starts delivering a new program subsequently transferred from the storage server modules so that it appears to take a short response time for a visual search from a viewpoint of a terminal.

In a case of the data read processing shown in FIG. 13 and the data write processing shown in FIG. 17, each storage server module manages its own time-slots alone, so that even when an idle time-slot is selected, there is no need to notify a selected time-slot to all the storage server modules.

Moreover, in a case of the data read processing shown in FIG. 13, even when the terminal issues a read request for another program or a visual search request such as that for jumping to another playback position within the same program, before the reading is completed up to the end of a certain program, it suffices for the storage server module that is carrying out the read processing at that point to release the currently used time-slot and selects a new idle time-slot, and there is no need to notify a time-slot release or a newly selected time-slot to the other storage server modules.

(2) Since different storage server modules do not manage the same synchronization information, it is possible to eliminate a possibility for different notices of the synchronization information pass each other.

In a case of the data read processing shown in FIG. 13 and the data write processing shown in FIG. 17, different storage server modules carry out different time-slot managements so that it is possible to eliminate a possibility for different storage server modules to select the same time-slot erroneously as different notices of the synchronization information pass each other.

(3) In a case of additionally providing a new storage server module or a new storage device in the storage server module, there is no need to change the synchronization information managed by all the storage server modules.

In a case of the data read processing shown in FIG. 13 and the data write processing shown in FIG. 17, when a new storage server module or a new storage device in the storage server module is additionally provided, it suffices to change the time-slot management information managed by this storage server module alone.

(4) Since no inconsistency arises in the synchronization information managed by the storage server modules, there is no need to regularly carry out a consistency check for the synchronization information among the storage server modules.

In a case of the data read processing shown in FIG. 13 and the data write processing shown in FIG. 17, no inconsistency arises in the time-slot management information because different storage server modules carry out different time-slot managements.

(5) There is no need to establish a time synchronization among all the storage server modules.

In a case of the data read processing shown in FIG. 13 and the data write processing shown in FIG. 17, the time-slot phase difference between consecutively ordered storage devices on the same storage server module must be one sub-cycle, but there is no need to maintain a constant time-slot phase difference between consecutively ordered storage devices on different server modules, so that there is no need to establish a time synchronization among different storage server modules.

(6) In a case of the data read processing shown in FIG. 13, the maximum response time with respect to a new read request is constant regardless of a number of storage server modules. For example, in FIG. 14, when there is a new read request, one of the twelve time-slots within three sub-cycles is selected even when a number of storage server modules is doubled, so that the maximum response time is three sub-cycles.

Note that the second embodiment has been described above for an exemplary case of using a plurality of communication server modules 3311 to 331M but the distributed multimedia server data access method of this second embodiment is equally applicable to a case of using only one communication server module.

It is to be noted that the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each communication server module and each storage server module in the distributed multimedia server device of FIG. 6 described above can be conveniently implemented in forms of software packages.

In addition, the entire distributed multimedia server device of FIG. 6 may be implemented in a form of a software package. In this case, the communication server modules and the storage server modules can be realized on a single PC. Note that the server device realized on a single PC in this manner is not physically distributed but still logically distributed.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A distributed multimedia server device for delivering requested multimedia data to a plurality of terminals, comprising:

a plurality of storage server modules for distributedly storing fixed length multimedia blocks dividing each multimedia data, and reading out multimedia blocks in response to multimedia block read requests;

a plurality of communication server modules, each capable of receiving a multimedia data read request for one multimedia data from a terminal through a connection set up with respect to the terminal, issuing the multimedia block read requests to the storage server modules so that the storage server modules read out multimedia blocks corresponding to said one multimedia data, and periodically delivering the multimedia blocks read out and transferred by the storage server modules to the terminal through the connection using a delivery period corresponding to a playback time of one multimedia block; and an inter-server module network for supporting communications between any of the storage server modules and of the communication server modules;

wherein each multimedia data is divided into fixed length segments, and segments are stored over the storage server modules in a cyclic order;

said device is configured so that segment read requests are issued sequentially from one communication server module to the storage server modules in said cyclic order, in response to a request for one multimedia data of one program from a terminal, said sequential issuance being timed to prevent interruption in a program playback at the terminal upon delivering segments read out by the storage server modules;

said device is further configured such that segments for said one multimedia data are read out at the storage server modules in response to the segment read requests from said one communication server module without establishing synchronization among the storage server modules, and segments read out by the storage server modules are delivered from said one communication server module to the terminal; and each said storage server module includes a plurality of storage devices in which segments are stored cyclically, and each said storage server module reads out segments stored in the storage devices cyclically in response to a segment read request from said one communication server module, by using an idle time-slot selected from a time-slot sequence formed by a prescribed number of time-slots arranged at uniform intervals, in a plurality of time-slot sequences with mutually displaced phases which are provided in correspondence to said plurality of storage devices, independently from other storage server modules.

2. The device of claim 1, wherein each storage server module reads out multimedia blocks stored therein without establishing synchronization with respect to other storage server modules.

3. The device of claim 1, wherein each communication server module delivers the multimedia blocks to the terminal without establishing synchronization with respect to other communication server modules.

4. The device of claim 1, wherein each communication server module sets up the connection with respect to the terminal upon receiving a connection request from the terminal prior to receiving the multimedia data read request from the terminal.

5. The device of claim 1, wherein each communication server module is capable of returning a connection reject response to a connection request from the terminal when said each communication server module has only insufficient processing power, the connection reject response containing an identifier of another communication server module which has sufficient processing power to which the terminal should make the connection request.

6. A distributed multimedia server data access method for a distributed multimedia server device formed by a plurality of storage server modules for distibutedly storing multimedia data, one or more communication server modules for delivering requested multimedia data read out from the storage server modules to terminals, and an inter-server module network for supporting communications between any of the storage server modules and any of the communication server modules, the method comprising the steps of:

dividing each multimedia data into fixed length segments, and storing segments over the storage server modules in a cyclic order;

sequentially issuing segment read requests from one communication server module to the storage server modules in said cyclic order, in response to a request for one multimedia data of one program from a terminal, said sequential issuance being scheduled so as to prevent interruptions in a program playback at the terminal upon delivering segments read out by the storage server modules; and reading out segments for said one multimedia data at the storage server modules in response to the segment read requests from said one communication server module without establishing synchronization among the storage server modules from said one communication server module to the terminal;

wherein each storage server module has a plurality of storage devices in which segments are stored cyclically, and each storage server module reads out segments stored in the storage devices cyclically in response to a segment read request from said one communication server module, by using an idle time-slot selected from a time-slot sequence formed by a prescribed number of time-slots arranged at uniform intervals, in a plurality of time-slot sequences with mutually displaced phases which are provided in correspondence to said plurality of storage devices, independently from other storage server modules.

7. The method of claim 6, further comprising the steps of:

dividing one multimedia data of one program into fixed length segments at one communication server module upon receiving a multimedia data write request for said one multimedia data from a multimedia data input device;

sequentially issuing segment write requests from said one communication server module to the storage server modules in a cyclic order by which segments are to be stored over the storage server modules; and writing segments for said one multimedia data at the storage server modules in response to the segment write requests from said one communication server module without establishing synchronization among the storage server modules.

8. The method of claim 7, wherein each storage server module has a plurality of storage devices in which segments are to be stored cyclically, and each storage server module writes segments into the storage devices cyclically in response to a segment write request from said one communication server module, by using an idle time-slot selected from a time-slot sequence formed by a prescribed number of time-slots arranged at uniform interval, in a plurality of time-slot sequences with mutually displaced phases which are provided in correspondence to said plurality of storage devices, independently from other storage server modules.

9. An article of manufacture, comprising:

a computer usable medium having computer readable program code means embodied therein for causing a computer to function as a distributed multimedia server device formed by a plurality of storage server modules for distributedly storing multimedia data, one or more communication server modules for delivering requested multimedia data read out from the storage server modules to terminals, and an inter-server module network for supporting communications between any of the storage server modules and any of the communication server modules, the computer readable program code means includes:

first computer readable program code means for causing said computer to divide each multimedia data into fixed length segments, and storing segments over the storage server modules in a cyclic order;

second computer readable program code means for causing said computer to sequentially issue segment read requests from one communication server module to the storage server modules in said cyclic order, in response to a request for one multimedia data of one program from a terminal, said sequential issuance being scheduled so as to prevent interruptions in a program playback at the terminal upon delivering segments read out by the storage server modules; and third computer readable program code means for causing said computer to read out segments for said one multimedia data at the storage server modules in response to the segment read requests from said one communication server module without establishing synchronization among the storage server modules, and delivering segments read out by the storage server modules from said one communication server module to the terminal;

wherein each storage server module has a plurality of storage devices in which segments are stored cyclically, and the third computer readable program code means controls said computer such that each storage server module reads out segments stored in the storage devices cyclically in response to a segment read request from said one communication server module, by using an idle time-slot selected from a time-slot sequence formed by a prescribed number of time-slots arranged at uniform intervals, in a plurality of time-slot sequences with mutually displaced phases which are provided in correspondence to said plurality of storage devices, independently from other storage server modules.

10. The article of manufacture of claim 9, wherein the computer readable program code means further includes:

fourth computer readable program code means for causing said computer to divide one multimedia data of one program into fixed length segments at one communication server module upon receiving a multimedia data write request for said one multimedia data from a multimedia data input device;

fifth computer readable program code means for causing said computer to sequentially issue segment write requests from said one communication server module to the storage server modules in a cyclic order by which segments are to be stored over the storage server modules; and sixth computer readable program code means for causing said computer to write segments for said one multimedia data at the storage server modules in response to the segment write requests from said one communication server module without establishing synchronization among the storage server modules.

11. The article of manufacture of claim 10, wherein each storage server module has a plurality of storage devices in which segments are to be stored cyclically, and the sixth computer readable program code means controls said computer such that each storage server module writes segments into the storage devices cyclically in response to a segment write request from said one communication server module, by using an idle time-slot selected from a time-slot sequence formed by a prescribed number of time-slots arranged at uniform interval, in a plurality of time-slot sequences with mutually displaced phases which are provided in correspondence to said plurality of storage devices, independently from other storage server modules.

\* \* \* \* \*

UNITED STATES PATENT AND TRADEMARK OFFICE
CERTIFICATE OF CORRECTION

PATENT NO.     : 6,173,329 B1
DATED          : January 9, 2001
INVENTOR(S)    : Sasaki et al.

It is certified that error appears in the above-identified patent and that said Letters Patent is hereby corrected as shown below:

<u>Title page,</u>
Under Item [56], References Cited, please insert the following:

-- <u>OTHER REFERENCES</u>
Bolosky et al., "The Tiger Vidoe Fileserver", "<u>Microsoft Research, Microsoft Corporation</u>, Redmond, Washington, given at NOSSDAV '96 (International Workshop Network and Operating System Support for Digital Audio and Video), 1996, pp. 97-104. --

Signed and Sealed this

Eighteenth Day of June, 2002

*Attest:*

*Attesting Officer*

JAMES E. ROGAN
*Director of the United States Patent and Trademark Office*